United States Patent
Huang et al.

(10) Patent No.: US 9,612,973 B2
(45) Date of Patent: Apr. 4, 2017

(54) USING SHARED VIRTUAL MEMORY RESOURCES FOR PERFORMING MEMORY-MAPPING

(71) Applicant: Microsoft Corporation, Redmond, WA (US)

(72) Inventors: Jian Huang, Atlanta, GA (US); Anirudh Badam, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 287 days.

(21) Appl. No.: 14/076,204

(22) Filed: Nov. 9, 2013

(65) Prior Publication Data
US 2015/0134930 A1    May 14, 2015

(51) Int. Cl.
*G06F 12/10* (2016.01)
*G06F 12/02* (2006.01)
*G06F 12/1009* (2016.01)

(52) U.S. Cl.
CPC ...... *G06F 12/1009* (2013.01); *G06F 12/0253* (2013.01); *G06F 2212/656* (2013.01)

(58) Field of Classification Search
CPC ............. G06F 12/1009; G06F 12/0253; G06F 2212/656; G06F 2009/45583;
(Continued)

(56) References Cited

U.S. PATENT DOCUMENTS 6,804,766 B1* 10/2004 Noel ........................ G06F 12/08
711/203

7,111,145 B1* 9/2006 Chen ..................... G06F 12/109
703/23

(Continued)

FOREIGN PATENT DOCUMENTS

KR    1020040082921 A    9/2004
KR       100823171 B1    4/2008

OTHER PUBLICATIONS

Kyrola, et al., "GraphChi: Large-Scale Graph Computation on just a PC," retrieved at <<https://www.usenix.org/system/files/conference/osdi12/osdi12-final-126.pdf>>, Proceedings of the 10th USENIX Conference on Operating Systems Design and Implementation, Oct. 8, 2012, pp. 31-46.

(Continued)

*Primary Examiner* — Zhuo Li
(74) *Attorney, Agent, or Firm* — Rainier Patents, P.S.

(57) ABSTRACT

Functionality is described herein for memory-mapping an information unit (such as a file) into virtual memory by associating shared virtual memory resources with the information unit. The functionality then allows processes (or other entities) to interact with the information unit via the shared virtual memory resources, as opposed to duplicating separate private instances of the virtual memory resources for each process that requests access to the information unit. The functionality also uses a single level of address translation to convert virtual addresses to corresponding physical addresses. In one implementation, the information unit is stored on a bulk-erase type block storage device, such as a flash storage device; here, the single level of address translation incorporates any address mappings identified by wear-leveling and/or garbage collection processing, eliminating the need for the storage device to perform separate and independent address mappings.

20 Claims, 11 Drawing Sheets

(58) Field of Classification Search
CPC .. G06F 9/45558; G06F 11/2092; G06F 12/10; G06F 11/1482; G06F 12/0246; G06F 12/1081; G06F 2201/815; G06F 9/5016; G06F 12/1027; G06F 12/1036; G06F 12/109; G06F 2212/652; G06F 12/06; G06F 2212/654; G06F 12/0215; G06F 12/0292; G06F 2212/302; G06F 2212/655; G06F 12/145; G06F 2212/151; G11C 7/1075

See application file for complete search history.

(56) References Cited

U.S. PATENT DOCUMENTS

| | | | |
|---|---|---|---|
| 7,991,946 B2 | 8/2011 | Lee et al. | |
| 8,443,144 B2* | 5/2013 | Yim | G06F 12/0868 711/118 |
| 8,578,127 B2* | 11/2013 | Thatcher | G06F 3/0604 711/103 |
| 2012/0198129 A1* | 8/2012 | Van Aken | G06F 12/0246 711/103 |
| 2014/0122828 A1* | 5/2014 | Kagan | G06F 12/1081 711/206 |
| 2014/0164677 A1* | 6/2014 | Borchers | G06F 3/0611 711/103 |

OTHER PUBLICATIONS

Lee, et al., "A Log Buffer-Based Flash Translation Layer Using Fully-Associative Sector Translation," retrieved at <<http://acm.org>>, ACM Transactions on Embedded Computing Systems, vol. 6, No. 3, 2007, 27 pages.

Lim, et al., "SILT: A Memory-Efficient, High-Performance Key-Value Store," retrieved at <<http://acm.org>>, Proceedings of the Twenty-Third ACM Symposium on Operating Systems Principles, 2011, 13 pages.

"What is Memcached?," retrieved at <<http://memcached.org/>>, retrieved on Oct. 16, 2013, Danga Interactive, 2 pages.

Ousterhout, et al., "The Case for RAM Clouds: Scalable High-Performance Storage Entirely in DRAM," retrieved at <<http://acm.org>>, ACM SIGOPS Operating Systems Review, vol. 43, Issue 4, Jan. 2010, pp. 92-105.

Ouyang, et al., "SSD-Assisted Hybrid Memory to Accelerate Memcached over High Performance Networks," Proceedings of the 41st International Conference on Parallel Processing, Sep. 2012, pp. 470-479.

Pearce, et al., "Multithreaded Asynchronous Graph Traversal for In-Memory and Semi-External Memory," retrieved at <<http://acm.org>>, Proceedings of the ACM/IEEE International Conference for High Performance Computing, Networking, Storage and Analysis, 2010, 11 pages.

Larson, et al., "High-Performance Concurrency Control Mechanisms for Main-Memory Databases," retrieved at <<http://acm.org>>, Proceedings of the VLDB Endowment, vol. 5, Issue 4, Dec. 2011, pp. 298-309.

Saxena, et al., "FlashVM: Virtual Memory Management on Flash," Proceedings of the USENIX Conference on USENIX Annual Technical Conference, 2010, 14 pages.

Saxena, et al., "FlashTier: A Lightweight, Consistent and Durable Storage Cache," retrieved at <<http://acm.org>>, Proceedings of the 7th ACM European Conference on Computer Systems, Apr. 2012, pp. 267-280.

Van Essen, et al., "On the Role of NVRAM in Data-Intensive Architectures: An Evaluation," retrieved at <<http://ieeexplore.ieee.org/stamp/stamp.jsp?tp=&arnumber=6267871>>, IEEE 26th International Parallel & Distributed Processing Symposium, May 2012, pp. 703-714.

"Violin 6000 Series Flash Memory Array Data Sheet," retrieved at <<http://www.violin-memory.com/wp-content/uploads/Violin-Datasheet-6000.pdf?d=1>>, retrieved on Oct. 16, 2013, Violin Memory, Santa Clara, CA, 2 pages.

Volos, et al., "Mnemosyne: Lightweight Persistent Memory," retrieved at <<http://acm.org>>, Proceedings of the Sixteenth International Conference on Architectural Support for Programming Languages and Operating Systems, 2011, pp. 91-103.

Wang, eta l., "NVMalloc: Exposing an Aggregate SSD Store as a Memory Parition in Extreme-Scale Machines," retrieved at <<http://ieeexplore.ieee.org/stamp/stamp.jsp?tp=&arnumber=6267902>>, IEEE 26th International Parallel and Distributed Processing Symposium, May 2012, pp. 957-968.

Zaharia, et al., "Resilient Distributed Datasets: A Fault-Tolerant Abstractions for In-Memory Cluster Computing," retrieved at <<https://www.usenix.org/system/files/conference/nsdi12/nsdi12-final138.pdf>>, Proceedings of the 9th USENIX Conference on Networked Systems Design and Implementation, Apr. 2012, 14 pages.

Zhang, et al., "De-indirection for Flash-based SSDs with Nameless Writes," retrieved at <<https://www.usenix.org/system/files/conference/fast12/zhang.pdf>>, Proceedings of the 10th USENIX Conference on File and Storage Technologies, Feb. 2012, 16 pages.

Huanq, et al., "Joint Management of RAM and Flash Memory with Access Pattern Considerations," retrieved at <<http://ieeexplore.ieee.org/stamp/stamp.jsp?tp=&arnumber=6241608>>, Proceedings of the 49th Annual Design Automation Conference, Jun. 2012, pp. 882-887.

Wu, et al., "An Adaptive Two-Level Management for the Flash Translation Layer in Embedded Systems," retrieved at <<http://acm.org>>, Proceedings of the 2006 IEEE/ACM International Conference on Computer-aided Design, 2006, pp. 601-606.

Sequeira, Rodolphe, "Integrating an Existing FTL in the Symbian™ OS," retrieved at <<http://www.micron.com/~/media/Documents/Products/Software%20Article/SWNL_integrating_existing_ftl_in_symbian.pdf>>, 2011, Micron Technology, Inc., Boise, Idaho, 3 pages.

Kim, et al., "A Space-Efficient Flash Translation Layer for Compactflash Systems," retrieved at <<http://lass.cs.umass.edu/~shenoy/courses/fall07/papers/ftl.pdf>>, IEEE Transactions on Consumer Electronics, vol. 48, Issue 2, 2002, pp. 366-375.

Wu, et al., "A Low-Memory Address Translation Mechanism for Flash-Memory Storage Systems," retrieved at <<http://www.iis.sinica.edu.tw/page/jise/2011/201109_12.pdf>>, Journal of Information Science and Engineering, vol. 27, Issue 5, 2011, pp. 1713-1727.

Agarwal, et al., "Design Tradeoffs for SSD Performance," in Proceedings of the USENIX 2008 Annual Technical Conference on Annual Technical Conference, Jun. 2008, 14 pages.

Ananthanarayanan, et al., "PACMan: Coordinated Memory Caching for Parallel Jobs," in Proceedings of the 9th USENIX Conference on Networked Systems Design and Implementation, Apr. 2012, 14 pages.

Caulfield, et al., "Providing Safe, User Space Access to Fast, Solid State Disks," Proceedings of the Seventeenth International Conference on Architectural Support for Programming Languages and Operating Systems, Mar. 2012, 13 pages.

Chidambaram, et al., "Consistency Without Ordering," in Proceedings of the 10th USENIX Conference on File and Storage Technologies, Feb. 2012, 16 pages.

Gorman, Mel, Understanding the Linux Virtual Memory Manager, Prentice Hall, 2004, Amazon.com product page only, available at <<http://www.amazon.com/Understanding-Linux-Virtual-Memory-Manager/dp/0131453483>>, accessed on Sep. 26, 2014, 6 pages.

"The OpenSSD Project," available at <<http://www.openssd-project.org/wiki/The_OpenSSD_Project>>, accessed on Sep. 26, 2014, 3 pages.

Cooper, et al., "Benchmarking Cloud Serving Systems with YCSB," retrieved at <<http://acm.org>>, Proceedings of the 1st ACM symposium on Cloud Computing, 2010, pp. pp. 143-154.

Kwak, et al., "What is Twitter, a Social network or a News Media?," retrieved at <<http://acm.org>>, Proceedings of the 19th International Conference on World Wide Web, 2010, pp. 591-600.

(56) References Cited

OTHER PUBLICATIONS

Lee, et al., "Architecting Phase Change Memory as a Scalable DRAM Alternative," retrieved at <<http://acm.org>>, Proceedings of the 36th Annual International Symposium on Computer Architecture, 2009, pp. 2-13.
"GraphChi, Disk-based large-scale graph computation," retrieved at <<http://graphlab.org/graphchi/>>, retrieved on Oct. 16, 2013, GraphLab, Carnegie Mellon University, Pittsburgh, PA, 4 pages.
Redis homepage, retrieved at <<http://redis.io/>>, retrieved on Oct. 16, 2013, 1 page.
"How fast is Redis?," retrieved at <<http://redis.io/topics/benchmarks>>, retrieved on Oct. 16, 2013, 12 pages.
About Twitter: The fastest, simplest way to stay close to everything you care about, retrieved at <<https://twitter.com/about>>, retrieved on Oct. 16, 2013, Twitter Inc., San Francisco, CA, 3 pages.
"6000 Series Flash Memory Arrays," retrieved at <<http://www.violin-memory.com/products/6000-flash-memory-array>>, retrieved on Oct. 16, 2013, Violin Memory, Santa Clara, CA, 3 pages.
"Who's using Redis," retrieved at <<http://redis.io/topics/whos-using-redis>>, retrieved on Oct. 16, 2013, 1 page.
"Yahoo! Cloud Serving Benchmark," retrieved at <<https://github.com/brianfrankcooper/YCSB/wiki>>, retrieved on Oct. 16, 2013, GitHub, Inc., 2 pages.
"ioDrive," retrieved at <<http://www.fusionio.com/products/iodrive/>>, retrieved on Oct. 16, 2013, Fusion-io, Inc., Cottonwood Heights, Utah, 2 pages.
Ananthanarayanan, et al., "PACMan: Coordinated Memory Caching for Parallel Jobs," retrieved <<https://www.usenix.org/system/files/conference/nsdi12/pacman.pdf>>, Proceedings of the 9th USENIX Conference on Networked Systems Design and Implementation, Apr. 2012, 14 pages.
Andersen, et al., "FAWN: A Fast Array of Wimpy Nodes," retrieved at <<http://acm.org>>, Proceedings of the ACM SIGOPS 22nd Symposium on Operating Systems Principles, 2009, 14 pages.
Badam, et al., "SSDAlloc: Hybrid SSD/RAM Memory Management Made Easy," retrieved at <<https://www.usenix.org/legacy/event/nsdi11/tech/full_papers/Badam.pdf>>, Proceedings of the 8th USENIX Conference on Networked Systems Design and Implementation, 2011, 14 pages.
Badam, et al., "Better Flash Access via Shapeshifting Virtual Memory Pages," retrieved at <<http://research.microsoft.com/pubs/199161/chameleon_trios2013.pdf>>, retrieved on Oct. 16, 2013, 14 pages.
Balarishnan, et al., "CORFU: A Shared Log Design for Flash Clusters," retrieved at <<https://www.usenix.org/system/files/conference/nsdi12/nsdi12-final30.pdf>>, Proceedings of the 9th USENIX Conference on Network Systems Design and Implementation, Apr. 2012, 14 pages.
Basu, et al., "Efficient Virtual Memory for Big Memory Servers," retrieved at <<http://acm.org>>, Proceedings of the 40th Annual International Symposium on Computer Architecture, Jun. 2013, pp. 237-248.

Canim, et al., "SSD Bufferpool Extensions for Database Systems," retrieved at <<http://acm.org>>, Proceedings of the VLDB Endowment, vol. 3, Issue 1-2, Sep. 2010, pp. 1435-1446.
Caulfield, et al., "Gordon: Using Flash Memory to Build Fast, Power-Efficient Clusters for Data-Intensive Applications," retrieved at <<http://acm.org>>, Proceedings of the 14th International Conference on Architectural Support for Programming Languages and Operating Systems, 2009, pp. 217-228.
Chen, et al., "Understanding Intrinsic Characteristics and System Implications of Flash Memory Based Solid State Drives," retrieved at <<http://acm.org>>, ACM SIGMETRICS Performance Evaluation Review, 2009, pp. 181-192.
Coburn, et al., "NV-Heaps: Making Persistent Objects Fast and Safe with Next-Generation, Non-Volatile Memories," retrieved at <<http://acm.org>>, Proceedings of the Sixteenth International Conference on Architectural Support for Programming Languages and Operating Systems, 2011, pp. 105-117.
Debnath, et al., "FlashStore: High Throughput Persistent Key-Value Store," retrieved at <<http://acm.org>>, Proceedings of the VLDB Endowment, vol. 3, No. 2, pp. 1414-1425.
Do, et al., "Turbocharging DBMS Buffer Pool Using SSDs," retrieved at <<http://acm.org>>, Proceedings of the 2011 ACM SIGMOD International Conference on Management of Data, 2011, pp. 1113-1124.
"ioDrive Octal," retrieved at <<http://www.fusionio.com/platforms/iodrive-octal/>>, retrieved on Oct. 16, 2013, Fusion-io, Inc., Cottonwood Heights, Utah, 2 pages.
Grund, et al., "HYRISE—A Main Memory Hybrid Storage Engine," retrieved at <<http://acm.org>>, Proceedings of the VLDB Endowment, vol. 4, Issue 2, 2010, pp. 105-116.
Gupta, et al., "DFTL: A Flash Translation Layer Employing Demand-based Selective Caching of Page-level Address Mappings," retrieved at <<http://acm.org>>, Proceedings of the 14th International Conference on Architectural Support for Programming Languages and Operating Systems, 2009, pp. 229-240.
Josephson, et al., "DFS: A File System for Virtualized Flash Storage," retrieved at <<https://acm.org>>, ACM Transactions on Storage (TOS), vol. 6, Issue 3, Article 14, Sep. 2010, 25 pages.
Jung, et al., "Revisiting Widely Held SSD Expectations and Rethinking System-Level Implications," retrieved at <<http://acm.org>>, SIGMETRICS International Conference on Measurement and Modelling of Computer Systems, Jun. 2013, pp. 203-216.
Kang, et al., "A Superblock-Based Flash Translation Layer for NAND Flash Memory," retrieved at <<http://acm.org>>, Proceedings of the 6th ACM & IEEE International Conference on Embedded Software, 2006, pp. 161-170.
Kilburn, et al., "One-Level Storage System," IRE Transactions on Electronic Computers, vol. 2, 1962, pp. 223-235.
"ioMemory VSL 2.3.11," User Guide for Microsoft Windows, published Oct. 24, 2012, Fusion-io, Inc., Cottonwood Heights, Utah, 73 pages.

\* cited by examiner

USING SHARED VIRTUAL MEMORY RESOURCES FOR PERFORMING MEMORY-MAPPING

BACKGROUND

In a technique referred to as memory-mapping, a computer system maps some portion of a file or other information item into virtual memory. The computer system then accesses the file via the virtual memory. More specifically, each application process which interacts with a memory-mapped file will create its own private instance of virtual memory resources for use in interacting with the file. For instance, each process will create its own copy of page tables for use in interacting with the file. A process will destroy its private instance of the resources when it is finished using them.

Consider the particular case in which the computer system uses DRAM in conjunction with a flash storage device or other bulk-erase type block storage device to interact with a file. In that case, the computer system first consults the page tables associated with a process to determine whether a specified virtual address is currently resident in main memory. If not, the computer system may use a file system to map the specified address to a location in secondary storage. A flash translation layer provided by the flash storage device next converts the address provided by the file system to the actual physical location at which the desired data item is stored in the flash storage device. Hence, the computer system performs three levels of address translation when it encounters a page fault.

SUMMARY

Functionality is described herein for memory-mapping an information item (such as a file) into virtual memory by associating shared virtual memory resources with the information unit. The functionality then allows processes (or other entities) to interact with the information unit via the shared virtual memory resources, as opposed to duplicating separate private instances of the virtual memory resources for each process that requests access to the information unit. In view of this behavior, the shared virtual memory resources may be considered as system-wide resources for use in interacting with the information unit, rather than process-specific resources.

According to one implementation, the shared virtual memory resources include one or more self-contained memory (SCoMe) units, each associated with a particular information unit (e.g., a file). Each SCoMe unit identifies one or more SCoMe virtual memory regions. Each SCoMe unit further provides a leaf page table for each SCoMe virtual memory region. The functionality uses the leaf page table to map a virtual address within an associated virtual memory region to a corresponding physical address.

According to another aspect, each entry in a leaf page table (of a SCoMe unit) specifies a physical address. Control information provided by the leaf page table indicates whether the physical address corresponds to a location in main memory (e.g., DRAM) or an extended memory device (e.g., a flash storage device). Hence, the functionality can perform a single level of address translation to map a virtual address, specified by a process, to an actual physical location at which a desired data item is stored in a physical storage device.

According to another aspect, the functionality may integrate wear-leveling and garbage collection processes (and/or other management process(es)) into the virtual memory resources. As a result of this feature, the above-referenced single level of address translation may also take into account wear-leveling and/or garbage collection considerations.

As a whole, the functionality offers a more efficient manner of memory-mapping an information unit to virtual memory, compared to traditional methods. The improved efficiency ensues, in part, from a reduction in the number of page tables that are used in memory-mapping an information unit, coupled with a more streamlined manner of converting virtual addresses to physical addresses. For instance, the functionality can allow a computer system to integrate the functions performed by a virtual memory mechanism, a file system, and a flash translation layer into a single virtual memory address translation mechanism.

The above approach can be manifested in various types of systems, components, methods, computer readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes illustrative functionality by which processes or other entities can interact with memory-mapped information units (e.g., files) via shared virtual memory resources. Section B sets forth illustrative methods which explain the operation of the functionality of Section A. Section C describes illustrative computing functionality that can be used to implement any aspect of the features described in Sections A and B.

Figure 12:
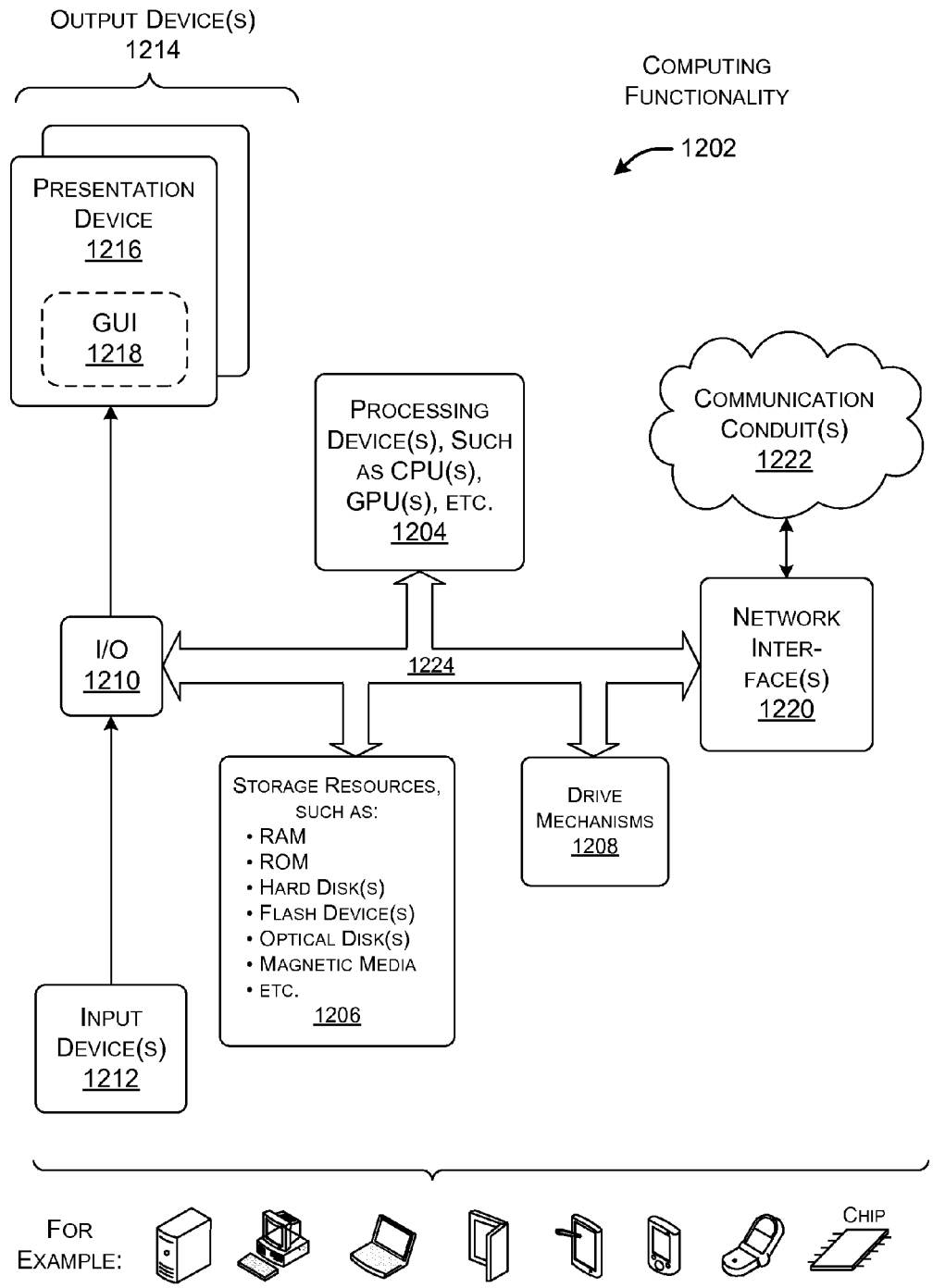
FIG. 12 shows illustrative computing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software running on computer equipment, hardware (e.g., chip-implemented logic functionality), etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 12, to be described in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software running on computer equipment, hardware (e.g., chip-implemented logic functionality), etc., and/or any combination thereof.

As to terminology, the phrase "configured to" encompasses any way that any kind of physical and tangible functionality can be constructed to perform an identified operation. The functionality can be configured to perform an operation using, for instance, software running on computer equipment, hardware (e.g., chip-implemented logic functionality), etc., and/or any combination thereof.

The term "logic" encompasses any physical and tangible functionality for performing a task. For instance, each operation illustrated in the flowcharts corresponds to a logic component for performing that operation. An operation can be performed using, for instance, software running on computer equipment, hardware (e.g., chip-implemented logic functionality), etc., and/or any combination thereof. When implemented by computing equipment, a logic component represents an electrical component that is a physical part of the computer system, however implemented.

The following explanation may identify one or more features as "optional." This type of statement is not to be interpreted as an exhaustive indication of features that may be considered optional; that is, other features can be considered as optional, although not expressly identified in the text. Finally, the terms "exemplary" or "illustrative" refer to one implementation among potentially many implementations.

A. Illustrative Functionality

Figure 1:
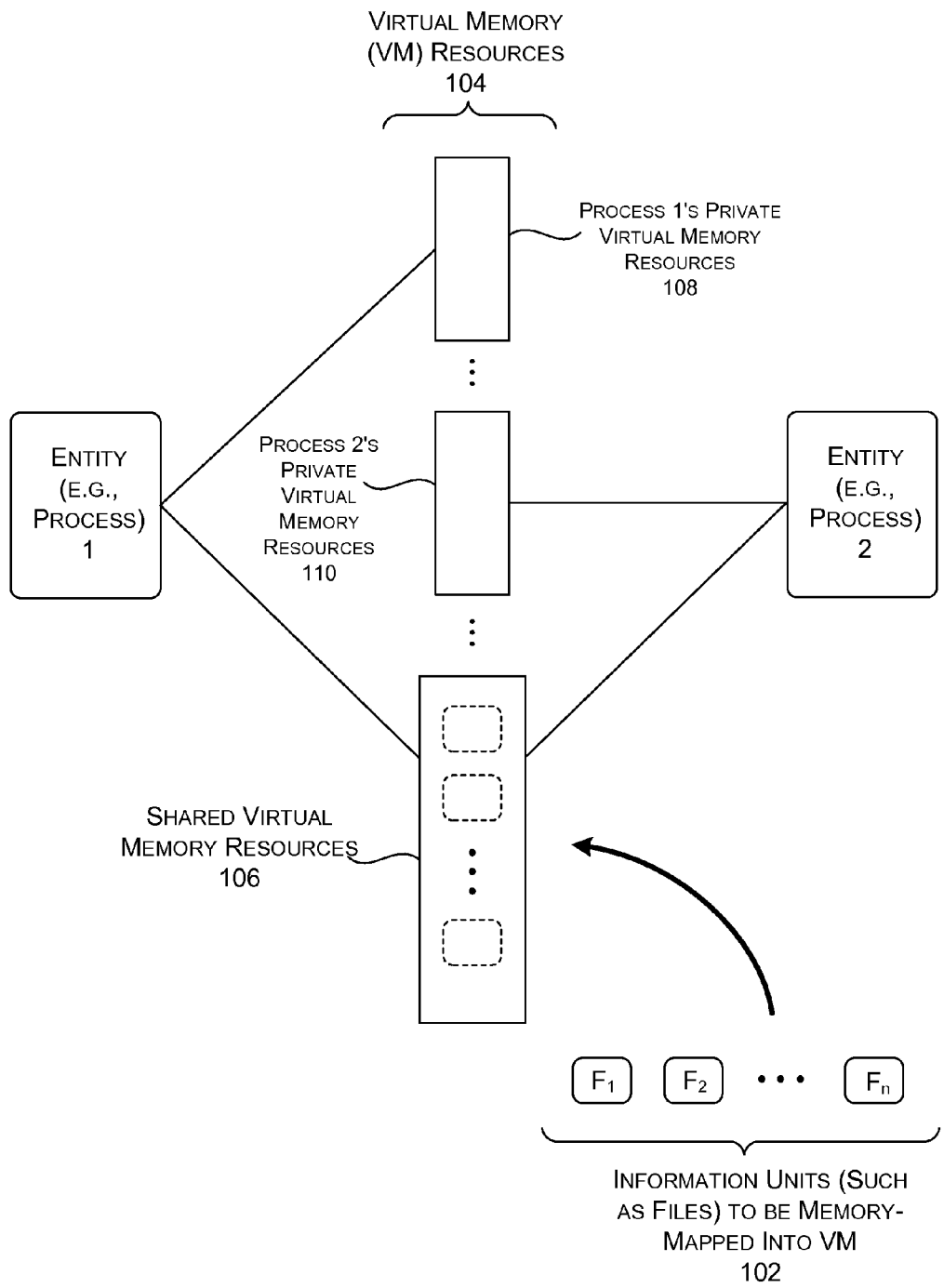
FIG. 1 shows a high-level representation of a strategy for using shared virtual memory resources to mediate access, by two or more processes (or other entities), to files or other information units.

FIG. 1 shows a strategy for memory-mapping information units 102 using a portion of virtual memory resources 104. (As used herein, an "information unit" represents any collection of data items of any type or combination of types. For example, an information unit may correspond to a file or a portion of a file containing non-executable data, instructions, etc., or any combination thereof.) The allocated portion of the virtual memory resources 104 is referred to herein as shared virtual memory resources 106. All entities that interact with the information units 102 (such as the illustrated "entity 1" and "entity 2") do so via the shared virtual memory resources 106. Because of the shared nature of the shared virtual memory resources 106, these resources may be considered as system-wide assets that are "owned" by the computer system, or its operating system.

In contrast, in a traditional approach, the first and second entities would create two separate instances of virtual memory resources. The first entity would then interact with the information units 102 using its private version of the virtual memory resources, while the second entity would interact with the information units 102 using its private version of the virtual memory resources. More concretely stated, each entity would create and utilize a separate copy of a set of page tables by which the entity translates virtual addresses to physical addresses. In this traditional approach, then, each separate instance of virtual memory resources may be considered as owned by its hosting entity. The computer system destroys each private version of the virtual memory resources once its hosting entity is finished using it.

The term "entity" as used herein is intended to have broad connotation. It may refer to a process that uses the virtual memory resources 104, such as a process provided by an application or some other functional module within a computer system. Or an entity may correspond to a virtual machine guest, etc. Nevertheless, to facilitate and simplify explanation, the ensuing description makes reference to the particular case in which entities correspond to processes.

Each process may also access private virtual memory resources. For example, the first process may interact with first private virtual memory resources 108, while the second process may interact with second private virtual memory resources 110. Each process may utilize its private virtual memory resources to interact with non-memory-mapped data items. Further, each process may utilize portions of its private virtual memory resources to link to the shared virtual memory resources 106, as will be clarified below.

The strategy shown in FIG. 1 may have a number of technical advantages over the traditional approach. First, the computer system may use fewer virtual memory resources compared to the traditional approach, since it allows all processes to use the same virtual memory resources 106 when interacting with the information units 102. More concretely stated, the computer system may produce a reduced number of page tables compared to the traditional approach, particularly in the scenario in which an information unit contains a large number of information items.

Second, the computer system may leverage the virtual memory resources 104 to simplify the manner in which it translates virtual addresses to physical address, essentially using the virtual memory resources 104 to perform all address mappings in the computer system, including address mapping traditionally associated with wear-leveling and/or garbage collection processes. Traditional approaches have used multiple mechanisms within the computer system to perform this translation, all with their respective mapping schemes. The following description will clarify the nature of both of these potential benefits.

In addition, the strategy shown in FIG. 1 can continue to offer traditional benefits associated with virtual memory. For example, a computer system can rely on the virtual memory resources 104 to: (1) reduce or eliminate the need by individual processes to separately manage their access to physical memory; (2) provide isolation between processes; (3) and give each process the "illusion" that it has access to more physical memory (in DRAM) than is actually available to it, etc.

Figure 2:
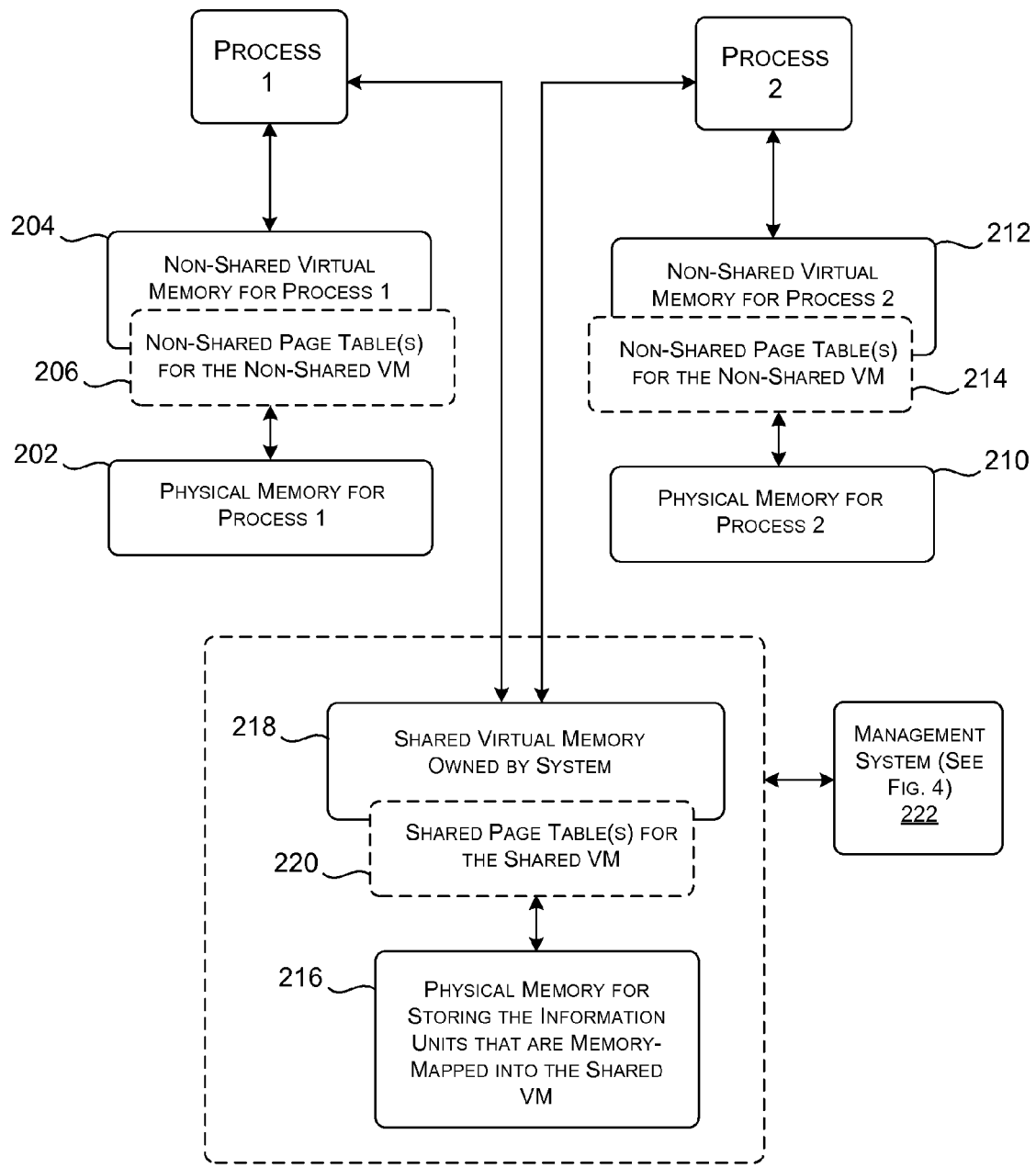
FIG. 2 shows additional detail regarding the strategy of FIG. 1.

FIG. 2 shows one way of implementing the strategy of FIG. 1. As indicated there, the first process ("process 1") accesses physical memory 202 via private virtual memory 204, using one or more non-shared page tables 206. Virtual memory, in general, constitutes an abstract representation of storage space as seen by an application process; data items that are "stored" in virtual memory are physically stored in underlying physical memory. Page tables are the mechanisms by which the computer system translates virtual addresses, as specified by an application process, to actual physical addresses. In the present context, the computer system uses the non-shared page tables 206 to convert virtual addresses that lie within the range of the private virtual memory 204 to physical addresses, corresponding to locations within the physical memory 202. In general, the combination of the private virtual memory 204 and the corresponding non-shared page tables 206 may be considered as private or non-shared virtual memory resources that are accessible to the first process.

Similarly, the second process ("process 2") accesses physical memory 210 via private virtual memory 212, using one or more non-shared page tables 214. The computer system uses the non-shared page tables 214 to convert virtual addresses that lie within the range of the private virtual memory 212 to physical addresses, corresponding to locations with the physical memory 210. The combination of the private virtual memory 212 and the corresponding non-shared page tables 214 may be considered as private or non-shared virtual memory resources that are accessible to the second process.

Both the first and second processes may also access physical memory 216 via shared virtual memory 218, using one or more shared page tables 220. The computer system uses the shared page tables 220 to convert virtual addresses that lie within the range of the shared virtual memory 218 to physical addresses, corresponding to locations with the physical memory 216. In general, the combination of the shared virtual memory 218 and the corresponding shared page tables 220 may be considered as shared virtual memory resources that are accessible to any process that runs on the computer system. In the context of the explanation of FIG. 1, the physical memory 216 may store any information unit (e.g., any file), or any portion of an information unit, that has been memory mapped into the shared virtual memory 218.

Figure 4:
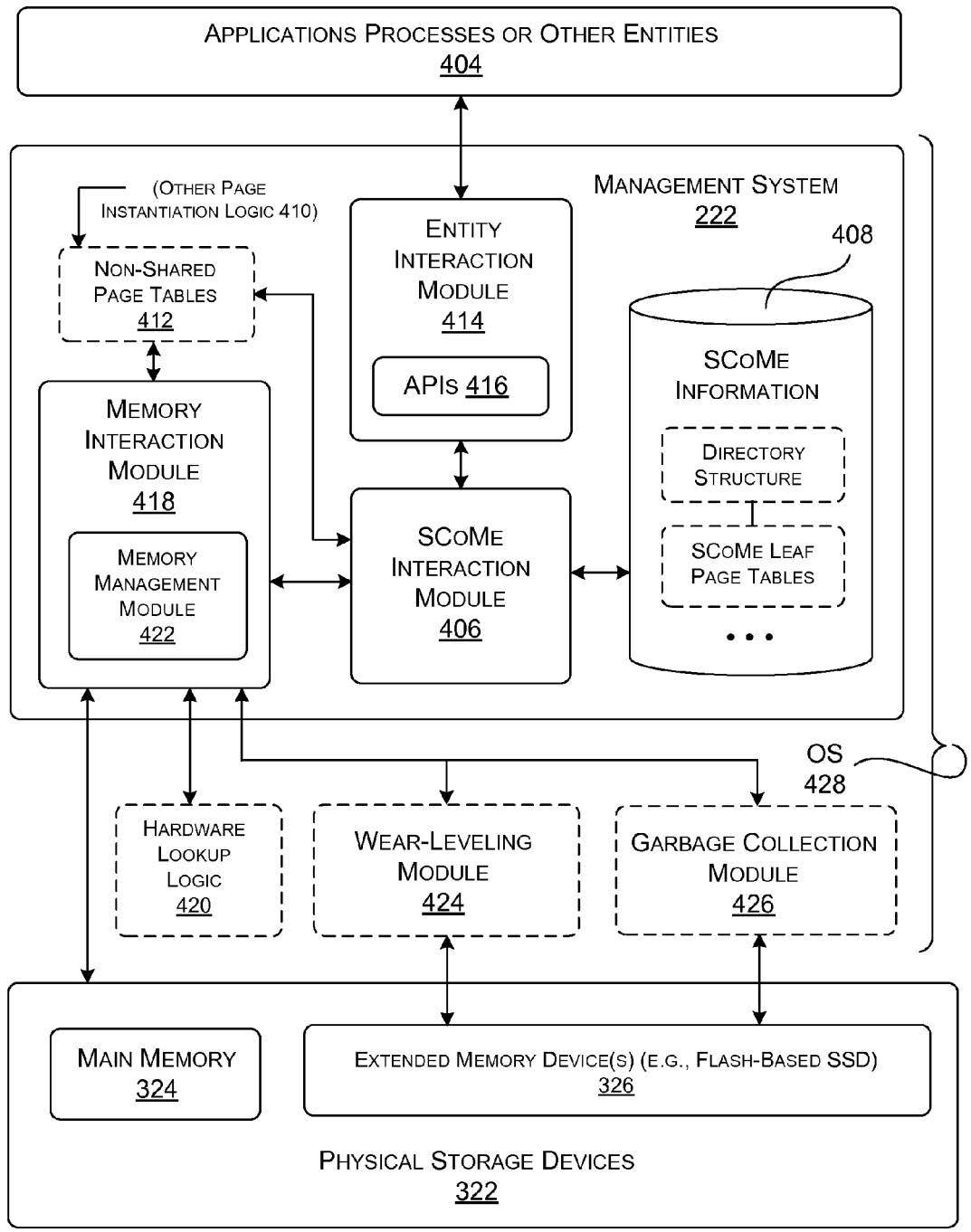
FIG. 4 shows a computer system for implementing the strategy of FIG. 1, using the SCoMe units of FIG. 3.

A management system 222 creates and maintains the shared virtual memory resources, and governs the behavior of the shared memory resources. FIG. 4, to be explained below, provides additional illustrative details regarding one implementation of the management system 222.

Figure 3:
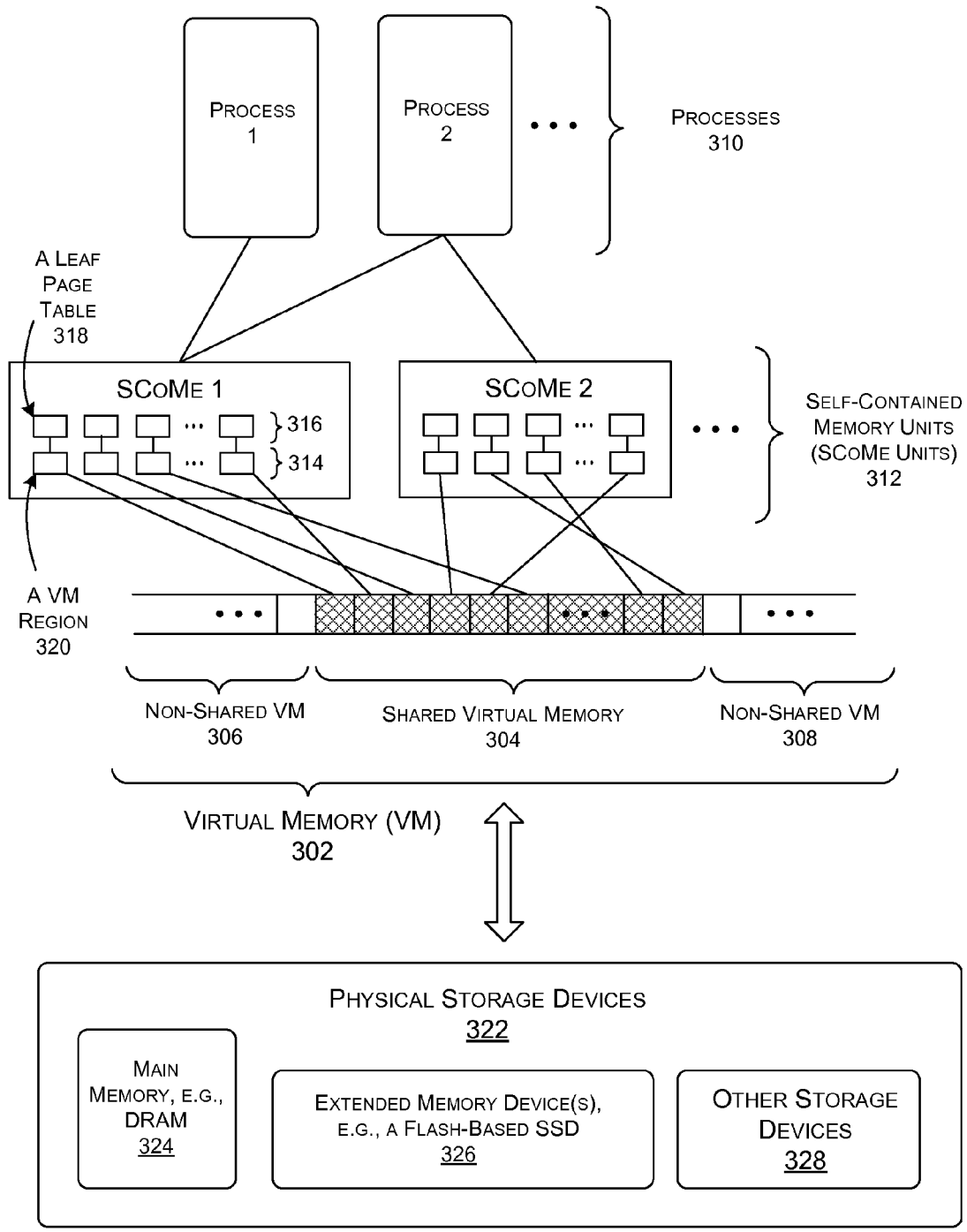
FIG. 3 depicts one manner of implementing the shared virtual memory resources in the strategy of FIG. 1. As indicated there, the shared virtual memory resources may be implemented as a collection of self-contained memory (SCoMe) units, each associated with a particular information unit (e.g., a file).

FIG. 3 shows one manner of implementing the shared virtual memory resources in the strategies of FIGS. 1 and 2. As indicated there, the computer system may provide virtual memory 302, representing all virtual memory available to the computer system. The computer system may then allocate a part of the virtual memory 302 as shared virtual memory 304, which constitutes a system-wide feature. FIG. 3 shows the shared virtual memory 304 as a swath of contiguous virtual addresses, but the shared virtual memory 304 need not be contiguous. The computer system designates the remainder of the virtual memory 302 as non-shared virtual memory (e.g., non-shared virtual memory 306 and non-shared virtual memory 308).

Processes 310 may interact with information units (e.g., files) as memory-mapped resources by mapping these information units to the shared virtual memory 304. More specifically, the computer system may define a plurality of self-contained memory (SCoMe) units 312, each of which mediates access to a particular information unit (e.g., a particular file) or some part thereof. Each SCoMe unit, in turn, is made up of one or more virtual memory regions. Each virtual memory region identifies a portion of the shared virtual memory 304. The virtual memory regions may be contiguous or non-contiguous with respect to each other.

Further, a SCoMe unit provides a leaf page table associated with each virtual memory region. Each leaf page table identifies a plurality of entries, such as, in one implementation, 512 entries. Each entry, in turn, maps a particular virtual address that falls within the associated virtual memory region into a corresponding physical address. The physical address identifies the location at which a data item, associated with the virtual address, is physically located on a storage device.

For example, the SCoMe 1 shown in FIG. 3 includes one or more virtual memory regions 314 carved out from the shared virtual memory 304. SCoMe 1 further includes corresponding leaf page tables 316. For instance, a particular leaf page table 318 provides entries for mapping virtual addresses to physical addresses for virtual addresses that falls within a particular virtual memory region 320. The SCoMe 1 as a whole is associated with a particular information unit or portion thereof, such as a file 1 (not shown); as such, the SCoMe 1 provides a vehicle by which any process may interact with the information unit as a memory-mapped entity. Each SCoMe unit is considered a system-owned resource because it is not "owned" by any particular process.

Each virtual memory region may have a size that corresponds to some integral multiple of the virtual memory coverage of a leaf-level page table. In one case, for example, the virtual memory region may have a size which is a multiple of 2 MB. The shared virtual memory 304 can also designate a contiguous or non-contiguous free region that contains shared virtual memory that is not currently assigned to any SCoMe unit. The management system 222 can allocate chunks of virtual memory (in units of 2 MB) from this free region to any SCoMe unit, e.g., to accommodate the scenario in which a process, which interacts with the SCoMe unit, dynamically requests additional virtual memory.

The information units themselves are physically stored on one or more physical storage devices 322. The physical storage devices 322 include main memory 324, which may be implemented as dynamic random access memory (DRAM). The physical storage devices 322 may also include one or more secondary storage devices which are treated as extended portions of main memory, and therefore referred to herein as at least one extended memory device 326. For example, one type of extended memory device may be implemented as a solid-state drive (SSD). The solid state drive may use any storage technology, such as any technology which manages information in units of blocks in a log-structured manner. These kinds of devices are referred to herein as bulk-erase block storage devices; examples of these devices include, but are not limited to, devices which use NAND-based flash storage technology, phase-change memory (PCM), and so on. The physical storage devices 322 may also include one or more other storage devices 328, such as a hard disk drive. In general, the computer system can more quickly and efficiently retrieve data items from main memory 324 compared to other kinds of storage mechanisms.

FIG. 4 shows a computer system 402 for implementing the strategies of FIGS. 1 and 2, using the SCoMe architecture of FIG. 3. The computer system 402 may represent any type of computing device (or devices), such a personal computer, a server, etc., provided at a single location or distributed over two or more locations. FIG. 12, to be described in turn, shows one implementation of computing functionality that can be used to implement the computer system 402 of FIG. 4.

The management system 222 (introduced in FIG. 2) manages the shared virtual memory resources. Managing, as the term is used here, encompasses several functions, including, but not limited to, creating, maintaining, and retiring the shared virtual memory resources, handling access by application processes 404 to the shared virtual memory resources, and handling interaction with data items stored on the physical storage devices 322.

A SCoMe interaction module 406 may serve as the main agent which mediates access to the shared virtual memory resources. For instance, when the computer system 402 boots up, the SCoMe interaction module 406 may define the shared virtual memory 304, selected from the total swath of available virtual memory 302. Each active process may then reserve the shared virtual memory 304 as part of its virtual memory. Each active process uses the shared virtual memory 304 to interact with any memory-mapped information unit that it opens in the course of its operation.

For example, assume that a first process executes an instruction to open a file as a memory-mapped resource. In response, the SCoMe interaction module 406 creates a corresponding SCoMe unit for use by the process in interacting with the file, such as SCoMe 1 shown in FIG. 3. The SCoMe interaction module 406 also returns a handle identifier to the process, for use by the process in subsequently interacting with the SCoMe unit. The process of creating a SCoMe unit involves selecting one or more virtual memory regions from the shared virtual memory 304, and producing leaf page tables corresponding to those regions. Next assume that a second process executes an instruction to also open the same file as a memory-mapped resource. The SCoMe interaction module 406 associates the second process with the same SCoMe unit that has already been created, without duplicating the SCoMe unit. The manner in which the SCoMe interaction module 406 links the second process to the existing SCoMe unit will be described in greater detail below.

The SCoMe interaction module 406 may store information which defines the shared virtual memory resources in a data store 408. For example, the data store 408 may store directory information which identifies the available SCoMe units. The directory information may use any data structure to represent the available SCoMe units, such as a tree data structure. The SCoMe information may also identify the virtual memory regions and leaf page tables associated with each SCoMe unit.

As stated, the SCoMe units constitute shared resources. The management system 222 may employ other logic 410 to produce non-shared page tables 412 in an on-demand manner. For example, a process may rely on the other logic 410 to produce page tables so as to interact with other data items, outside the scope of its interaction with memory-mapped files. The process may also rely on the other logic 410 to produce higher-level pages which link to the leaf page tables (in the manner described below).

Presume now that both the first and second process end, or otherwise terminate their interaction with the memory-mapped file. The SCoMe interaction module 406 can address this situation in different ways, corresponding to different respective implementations. In one case, the SCoMe interaction module 406 may "retire" the SCoMe unit (corresponding to the now-unused memory-mapped file). Retirement may constitute deleting the information associated with the SCoMe unit (such as its leaf page tables), or moving the information from the main memory 324 to a secondary storage device (such as the extended memory device 326), and/or some other action. The SCoMe interaction module 406 can also free up the portion of shared virtual memory 304 that was previously used by the SCoMe unit being retired. The SCoMe interaction module 406 can perform these clean up tasks at any juncture. In one case, the SCoMe interaction module 406 performs the above-described cleanup tasks immediately, once it is detected that no process is currently using a SCoMe unit. In another case, the SCoMe interaction module 406 performs the tasks when its workload falls below a prescribed threshold, and/or when the amount of available memory falls below a prescribed threshold.

In another case, the SCoMe interaction module 406 may delay removal of the unused SCoMe unit for a prescribed amount of time. The SCoMe interaction module 406 delays removal based on the possibility that a process may soon again request interaction with this SCoMe unit and its corresponding memory-mapped file. Once the delay period has expired, the SCoMe interaction module 406 can remove the SCoMe unit in any manner described above, e.g., by removing the SCoMe unit immediately, or when the SCoMe interaction module 406 is idle and/or when the amount of available memory falls below a prescribed threshold.

The SCoMe interaction module 406 can create and manage the SCoMe units in different ways. In one approach, the SCoMe interaction module 406 may establish a management process. In operation, when an application process opens an information unit for the first time as a memory-mapped resource, the SCoMe interaction module 406 may assign a corresponding SCoMe unit to the management process. The SCoMe interaction module 406 may then link the application process with the leaf page tables of the SCoMe unit, without actually duplicating the SCoMe unit and its leaf page tables. In other words, the management process serves as a kind of holding "receptacle" for "holding" all SCoMe units that have been created by application processes, and not yet retired. The above approach represents one non-limiting implementation among other possible implementations; in another case, for instance, the SCoMe interaction module 406 can associate each SCoMe unit with the application process which results in its creation—that is, the application process which first opens a corresponding information unit as a memory-mapped resource.

Further, the SCoMe interaction module 406 can provide a management SCoMe unit to store all of the SCoMe information provided in the data store 408. That is, the management SCoMe unit stores metadata which defines the other SCoMe units. The management SCoMe unit may otherwise have the structure described above, being made up of one or more virtual memory regions and corresponding leaf page tables. The data items associated with the management SCoMe unit may be physically stored on any storage device or combination of storage devices, such as the extended memory device 326.

An entity interaction module 414 may allow the application processes 404 to interact with memory-mapped information units via the SCoMe units. The entity interaction module 414 can perform this interaction via one or more different types of application programming interfaces (APIs) 416. A first set of APIs can allow an application to interact with a SCoMe unit in the manner in which a file system interacts with its files. For example, the entity interaction module 414 can use these APIs to open an information unit, read from an information unit, write to an information unit, determine status information pertaining to an information unit, and so on. But the entity interaction module 414 works in a different way than a traditional file system (because a traditional file system does not leverage virtual memory in the manner described above). For example, the entity interaction module 414 can perform reading and writing operations by copying data items between a user-specified buffer and the virtual memory of an identified SCoMe.

With respect to the above-described first type of API, the entity interaction module 414 may represent each SCoMe unit to each application process as a single continuous unit, even though the virtual memory regions inside a SCoMe unit may not, in fact, be contiguous. In operation, the entity interaction module 414 can address the potential fragmentation of virtual memory within a SCoMe unit by translating a virtual address specified by an application process to an appropriate virtual address within the SCoMe unit being referenced. The entity interaction module 414 can perform this operation using any per-SCoMe translation scheme, such as a sparse-array translation mechanism. Since the virtual memory regions are relatively small in size (e.g., 2 MB in one implementation), the overhead of this translation mechanism is relatively small. Moreover, the entity interaction module 414 can produce this translation mechanism in an on-demand fashion.

In a second type of API, the entity interaction module 414 includes logic which allows an application process to map a SCoMe unit to a single continuous virtual memory region that is separate from the default virtual memory location of the SCoMe unit. An application process may wish to employ this function so that it can interact with the SCoMe unit (and its corresponding memory-mapped information unit) in a different manner from other application processes. The entity interaction module 414 can produce the above result by associating the new virtual memory region with the leaf page tables of the default SCoMe unit. That is, the entity interaction module 414 links to the new virtual memory region with the existing page tables of the default SCoMe unit, rather than duplicating those leaf page tables.

In a third type of API, the entity interaction module 414 can allow application processes to create persistent heaps using SCoMe units. The entity interaction module 414 performs this task by dynamically allocating memory from a specified SCoMe unit. If the specified SCoMe unit does not have sufficient memory to satisfy such an allocation request, it can request the SCoMe interaction module 406 to assign more memory to the SCoMe unit. The SCoMe interaction module 406 can allocate chunks of free virtual memory to SCoMe units in the above-described granularity, e.g., 2 MB in one non-limiting case.

By virtue of the use of the third type of API, a SCoMe unit that is used as a persistent heap may be mapped to the same virtual memory region across two or more application processes. This capability provides a way by which processes can share virtual memory without serializing the data items that they share.

The above-described three types of APIs are cited by way of example, not limitation. The entity interaction module 414 can accommodate the use of yet other ways of interacting with SCoMe units, and the information units that they represent.

Figure 5:
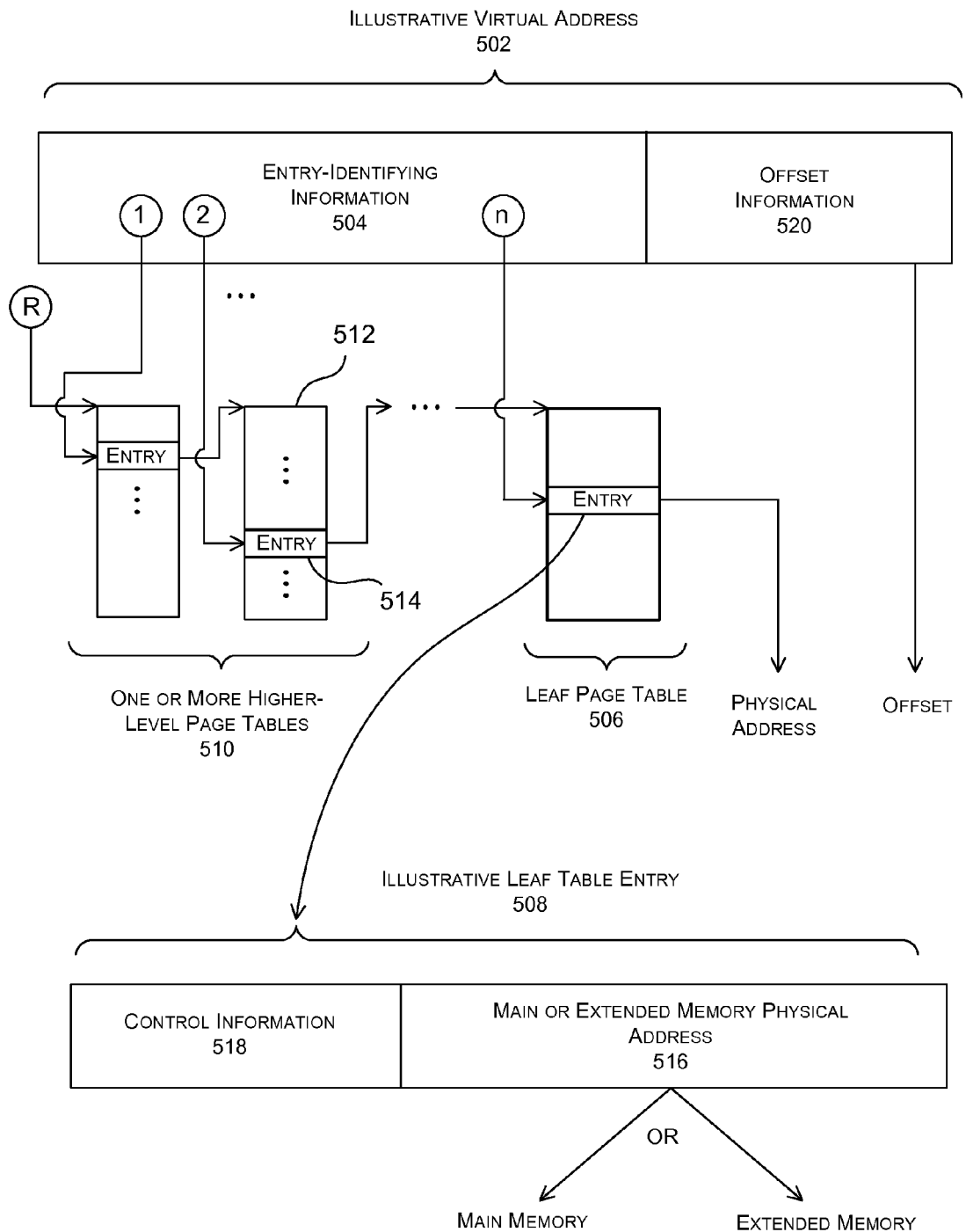
FIG. 5 shows a technique by which the computer system (of FIG. 4) maps virtual addresses into physical addresses.

A memory interaction module 418 allows application processes to interact with the physical storage devices 322, including the main memory 324 and the extended memory device 326. As one function, the memory interaction module 418 converts virtual addresses identified by application processes to physical addresses. The physical addresses correspond to locations on a specified physical storage device. The memory interaction module 418 can rely on hardware lookup logic 420 provided by the computer system 402, e.g., provided by the CPU of the computer system 402. The memory interaction module 418 performs this operation using a set of page tables. With respect to a particular application process, the set of page tables may encompass one or more process-specific non-shared page tables 412. If the application process is currently performing an operation that targets a SCoMe unit, then the page tables will also include one or more leaf page tables of this SCoMe unit, as maintained in the data store 408. FIG. 5, to be described below, provides additional information regarding one way in which the memory interaction module 418 may use one or more page tables to convert a virtual address to a physical address.

A memory management module 422, provided by the memory interaction module 418, can also manage data items in the main memory 324. As stated above, the main memory 324 may correspond to DRAM. The memory management module 422 can use any retention strategy, such as a least-recently-used (LRU) strategy, to identify data items in the main memory 324 that are least needed by the current application processes, at a current point in time, and to move those data items to the extended memory device 326. The memory management module 422 replaces the removed data items with other data items, pulled from the extended memory device 326, which are more urgently needed by the application processes at the current point in time. The memory management module 422 can also synchronize "dirty" entries in the main memory 324 with corresponding entries in the extended memory device 326 using known techniques, such that updates made to virtual memory are reflected in the persisted version of the data items.

In the following, presume that the extended memory device 326 represents a log-structured storage device, such as a bulk-erase type block storage device—or, more particularly, a flash storage device that uses any flash-based storage technology to store data items, such as NAND-based storage technology. Each storage location in this type of storage device accommodates a limited number of writes, after which the device can no longer be used. Further, a flash storage device cannot write a data item to a storage location unless that storage location has been erased, in advance. A typical flash storage device erases storage locations in units of blocks. A block is typically larger than a page of virtual memory.

A wear-leveling module 424 determines the locations at which data items are to be written in a flash storage device (or other kind of bulk-erase type block storage device). The wear-leveling module 424 attempts to distribute the use of storage locations in the flash storage device in a generally even manner. This approach reduces the possibility that a flash storage device will use up the write cycle capacity of some storage locations, while other storage locations remain much less utilized, thereby prematurely exhausting the usable lifetime of the flash storage device as a whole. The wear-leveling module 424 can use any wear-leveling strategy to perform this task, such as a dynamic wear-leveling strategy, a static wear-leveling strategy, and so on.

A garbage collection module 426 also manages the locations at which data items are written (and rewritten) in a flash storage device, so as to facilitate subsequent erasure of blocks of data items. The garbage collection module 426 applies any garbage collection strategy to perform this task. Generally, the garbage collection module 426 attempts consolidate active data items within the blocks of flash storage device, thereby freeing up unused blocks for erasure.

In one implementation, the management system 222 is implemented by an operating system 428 which runs on the computer system 402. The wear-leveling module 424 and the garbage collection module 426 can be implemented in different ways. In one implementation, the computer system 402 can implement the wear-leveling module 424 and/or the garbage collection module 426 as part of the operating system 428. For instance, the management system 222 itself can implement these modules. In another implementation, the wear-leveling module 424 and/or the garbage collection module 426 may be implemented, at least in part, by control logic provided by the extended memory device 326, which, as said, may represent a flash storage device. In any case, the memory interaction module 418 performs a single level of address translation that integrates any address mappings identified by the wear-leveling process and/or the garbage collection process.

More generally stated, the extended memory device 326 may rely on a management process to determine locations at which data items are to be written in the extended memory device 326. The management process takes into account the particular characteristics of the extended memory device 326, and may include wear-leveling and/or garbage collection as described above, but is not limited thereto. Any component (or plural components) within the management system 222 may implement the management process. The memory interaction module 418 performs a single level of address translation that takes into account any address mappings identified by the management process.

FIG. 5 shows a technique by which the memory interaction module 418 may access data items stored on a physical storage device, via the shared virtual memory, based on a specified virtual address.

An illustrative virtual address 502 may include entry-identifying information 504 that identifies a leaf page table 506 as well as a particular entry (e.g., entry 508) in the leaf page table 506. In one case, the entry-identifying information 504 provides an identifier which directly identifies a particular leaf page table 506. In another case, the leaf page table 506 corresponds to a leaf node in a hierarchal tree of higher-level page tables, such as higher-level page tables 510. In this case, the entry-identifying information 504 provides a set of identifiers which identify a sequence of one or more ancestor/parent tables which lead to the leaf page table 506, starting with a root node that points to a top-level directory page table. Each entry in a non-leaf page table points to a child page table.

In the context of computer system 402 of FIG. 4, a leaf page table that is associated with a virtual memory region of a SCoMe unit is a system-wide feature. Any process can link to this leaf page table. A leaf page table that is not associated with a SCoMe unit is a private feature associated with the process itself, and destroyed when it is no longer being used by the process. In either case, according to one implementation, the higher-level page tables of a process may represent non-shared resources of the process, such as higher-level page tables 510.

A process can link to a virtual memory region of a SCoMe unit by modifying an appropriate entry in a higher-level page table to point to the leaf page table of that virtual memory region. For example, assume that a higher-level page table 512 of a process serves as the parent page table of the leaf page table 506. An entry 514 in the higher-level page table 512 can be set to point to the leaf page table 506. Another process which uses the same virtual memory region of the SCoMe unit can include an entry in a higher-level page table which points to the same leaf page table 506.

The above implementation is set forth by way of illustration, not limitation. In another implementation, a SCoMe unit may encompass at least one higher-level page table, e.g., corresponding to the parent page table of the SCoMe unit's leaf page tables. In that case, the leaf page tables and the higher-level page tables are considered shared system-wide resources. A process can link to two or more virtual memory regions in a SCoMe unit by linking to the shared parent page table in the SCoMe unit, which, in turn, links to the desired virtual memory regions. In yet another case, the computer system 402 can specify linking information through other lookup mechanisms, e.g., besides the use of higher-level page tables.

The illustrative entry 508 shown in FIG. 5 specifies a physical address 516. The physical address 516, in turn, corresponds to a physical address within the main memory 324 (e.g., a DRAM) or a physical address within the extended memory device 326 (e.g., a flash storage device). Among other roles, control information 518 in the entry 508 specifies whether the physical address 516 is associated with the main memory 324 or the extended memory device 326.

The memory interaction module 418 uses the identified physical address 516, together with offset information 520 specified in the virtual address 502, to access a particular data item within a physical storage device. More specifically, the physical address specifies a physical starting address within the physical storage device. The offset information 520 identifies an offset location, relative to the starting address.

Assume that a data item is currently resident in main memory 324. As noted above, the physical address 516 specifies the location of the data item in main memory 324. Although not depicted in FIG. 5, the main memory 324 can also store the physical address at which the same data item is persisted in the extended memory device 326, providing an alternative physical address. Assume next that the memory interaction module 418 removes the data item from the main memory 324, such that it is now only resident in the extended memory device 326. The memory interaction module 418 can then access the alternative physical address from main memory 324 and insert it into the entry 508 for the data item. More specifically, the memory interaction module 418 may save alternative address information only for data items that are currently resident in the main memory 324, so the overhead of this address retention is relatively small.

From a more general standpoint, note that the memory interaction module 418 uses the page tables of the virtual memory resources to perform all address translation that is used to map a virtual address to a physical address, where the virtual memory resources include the shared leaf tables in conjunction the linking non-shared higher-level tables. As noted above, that single level of address translation encompasses any device-specific address mappings identified by the wear-leveling module 424, the garbage collection module 426, and/or any other device-specific management process. In contrast, as explained above, a traditional approach may resort to three tiers of address translation to perform this task. In a first level of the traditional process, the virtual memory uses the page tables to convert the specified virtual address to a physical address, providing that the desired data item is stored in the main memory. But if the desired data item is not in the main memory, then the computer system may use a file system translation mechanism (e.g., using a B-tree mechanism or the like) to convert the virtual address to a storage location on a secondary storage device. Providing that the secondary storage device is a flash storage device, a controller of the flash memory device may use its translation layer to convert a logical address, as specified by the file system, to an actual final location in the flash storage device.

In comparison to the traditional approach, the computer system 402 described herein can more efficiently access a desired data item, using fewer translation resources. In other words, the computer system 402 integrates the roles of a virtual memory, file system, and flash translation layer into the virtual memory resources. This is made possible, in part, through the "stabilization" of certain virtual memory resources, making them system-wide assets, rather than fleeting process-specific resources which are destroyed along with their hosting processes.

Figure 6:
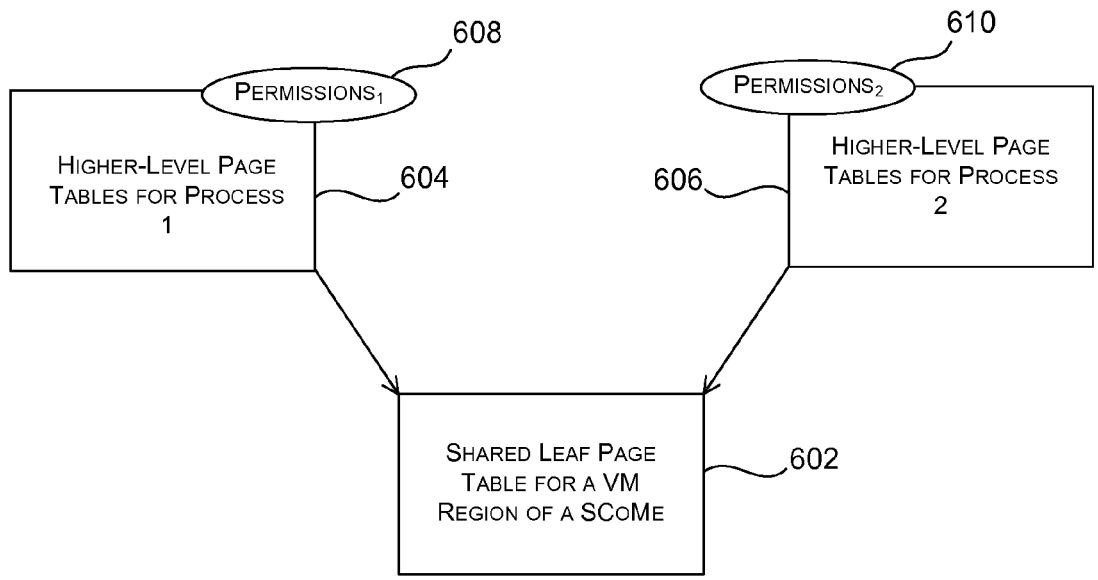
FIG. 6 shows one technique by which plural processes link to shared virtual memory resources, where at least one process specifies permission information via higher-level page tables.

FIG. 6 shows one technique by which plural processes may interact with shared virtual memory resources. In this context, the shared virtual memory resources correspond to a leaf page table 602 associated with a virtual memory region, which, in turn, is associated with a particular SCoMe unit. A first process may use one or more higher-level page tables 604 to link to the shared leaf page table 602, while a second process may use one or more other high-level page tables 606 to link to the same shared leaf page table 602. As stated above, the higher-level page tables (604, 606) are non-shared resources, private to the first and second processes, respectively. These higher-level page tables (604, 606) may establish links to the leaf page table 602 in the manner described above with respect to FIG. 5, or in some other manner.

The leaf page table 602 may internally specify permission information for each of its entries. Generally, permission information governs the access rights of a process with respect to a data item or a group of data items in any manner, e.g., by indicating that a particular data item or group of data items are read-only data items, read-and-write-permitted data items, no-access data items, and so on. In one implementation, any process which links to the shared leaf page table 602 is bound by the permission information specified in the leaf page table 602. This is because the leaf page table 602 is a shared resource, rather than a process-specific resource.

False sharing occurs when the page table of a process allows it to access a SCoMe unit when such a process has not opened or cannot otherwise use the SCoMe unit. In one implementation, the management system 222 prevents false sharing, in part, by preventing SCoMe units from sharing leaf page tables. Further, higher-level page tables of a process are not shared. Further, a higher-level page table that directly links to a leaf page table only points to a single virtual memory region in a single SCoMe unit.

The computer system 402 may provide other ways of specifying permission information. For example, the first process can specify first permission information 608 using its higher-level page tables 604, and the second process can specify second permission information 610 using its higher-level page tables 606. On this level, the permission information can specify access rights with respect to all of the data items referenced by the leaf page table 602. If the access rights of a high-level page table conflicts with the access rights specified in the child leaf page table 602, then the higher-level permission information may override the leaf-level permission information. The first permission information 608 may differ from the second permission information 610 in any manner. Or the first permission information 608 may be the same as the second permission information 610.

Figure 7:
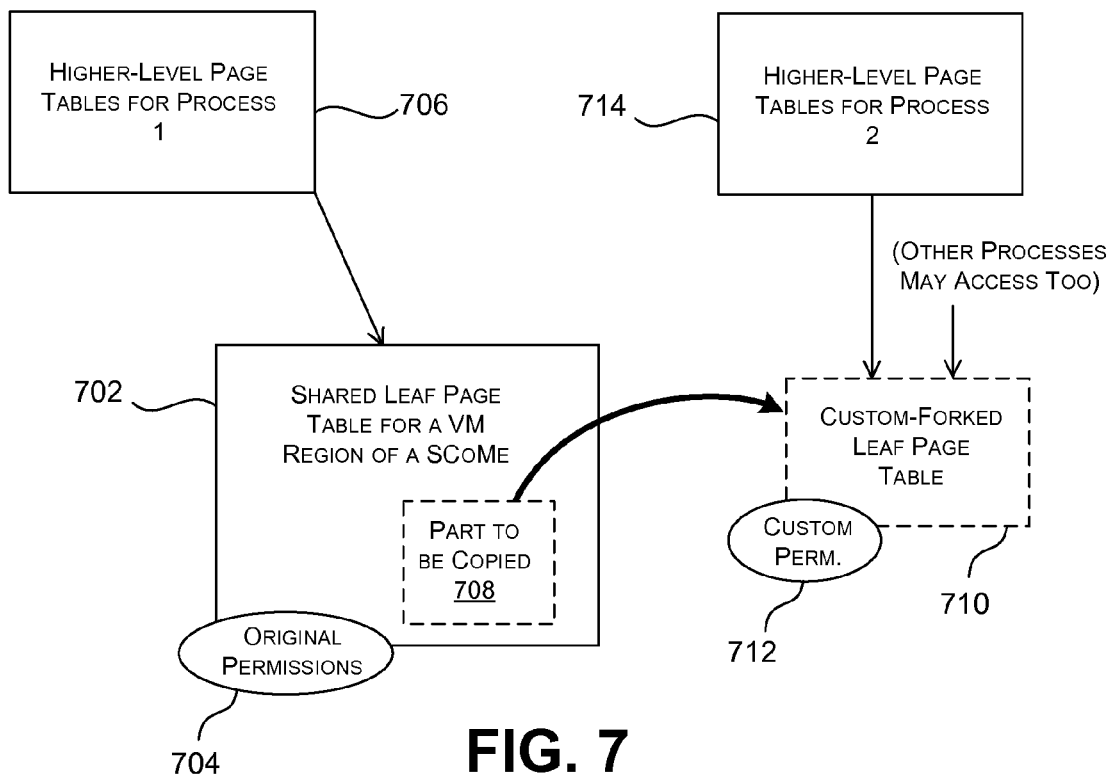
FIG. 7 shows one technique by which the computer system (of FIG. 4) may produce a forked version of a portion of the shared virtual memory resources, for the purpose of assigning custom permissions to that forked version.

FIG. 7 shows a way of establishing custom per-entry permissions. In this figure, a shared leaf page table 702 represents a shared virtual memory resource, corresponding to a virtual memory region of a SCoMe unit. Assume that the leaf page table 702 optionally provides original permission information 704. Any process which links to the leaf page table 702 is subject to the constraints of the original permission information 704 (unless that permission information 704 is overridden in the manner specified by FIG. 6). For example, a first process uses one or more higher-level page tables 706 to link to the leaf page table 702, and is therefore subject to the original permission information 704.

Assume that a second process also wishes to make use of the leaf page table 702 in order to interact with a portion of a memory-mapped file. But assume that the second process desires to assign custom permissions to only a subset of the data items represented by the leaf page table 702. Assume that a part 708 of the leaf page table 702 corresponds to that subset of data items. To accomplish that objective, the second process can direct the management system 222 to copy the part 708, yielding a forked leaf page table 710. That is, the forked leaf page table 710 contains only the entries in the part 708. The management system 222 then associates custom permission information 712 with the forked leaf page table 710, which differs from the original permission information 704 in any manner. The second process uses one or more higher-level page tables 714 to link to the forked leaf page table 710, and is therefore subject to the custom permission information 712, rather than the original permission information 704. The second process may also interact with the original leaf page table 702 with respect to other data items specified therein. The forked leaf page table 710 is considered a system-owned resource, just as the original leaf page table 702, rather than a process-specific resource. As such, one or more other processes can also link to the forked leaf page table 710 as a shared resource.

Figure 8:
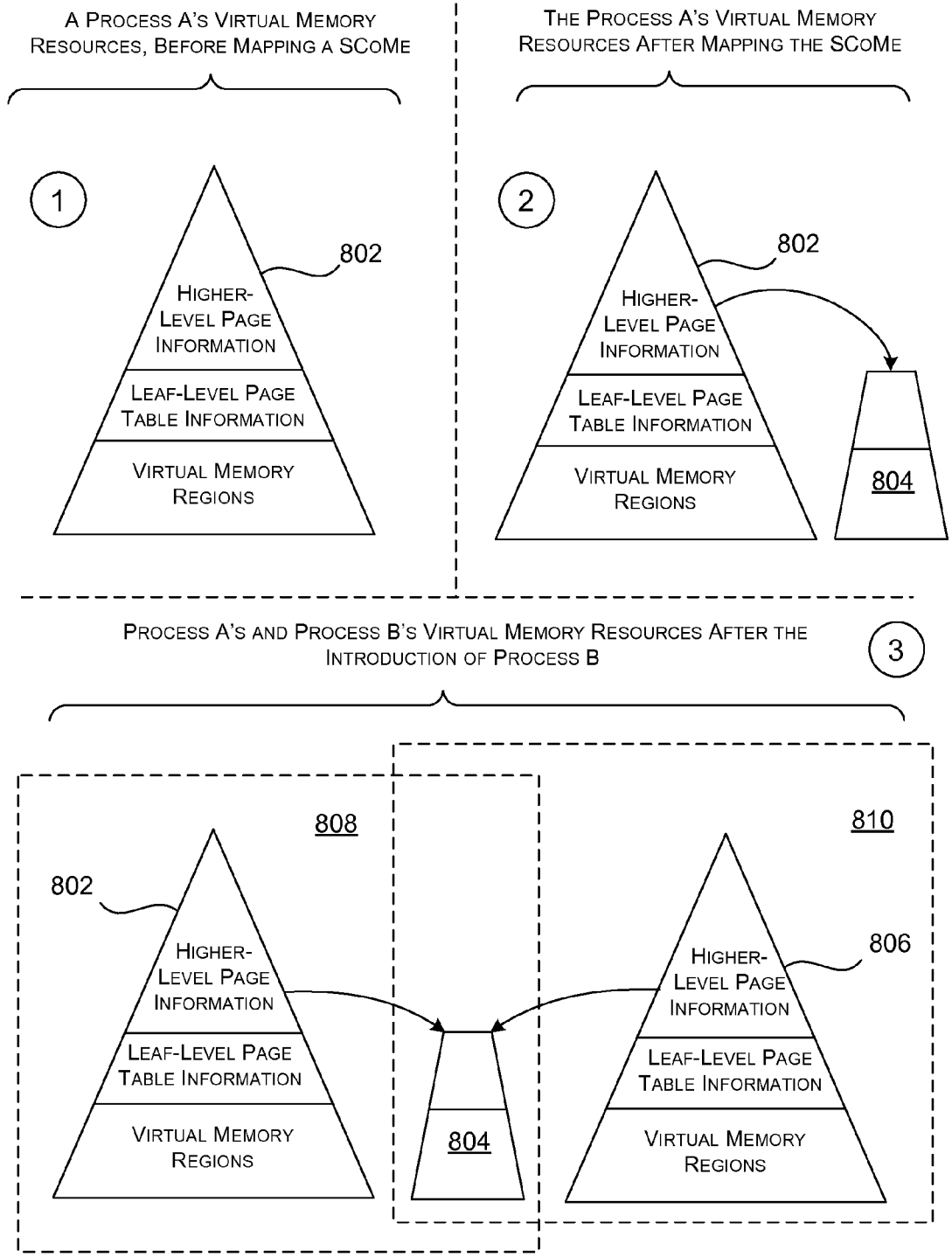
FIG. 8 depicts the utilization of virtual memory resources by two processes, at three different points in time.

FIG. 8 summarizes the above description by presenting a scenario in which two processes (process A and process B) make use of a SCoMe unit to interact with a memory-mapped file. In state (1), assume that process A is utilizing only non-shared virtual memory resources 802, which are created on demand for use by process A. In state (2), assume that process A executes an instruction to open a file as a memory-mapped resource. The management system 222 responds by creating a SCoMe unit, associated with shared virtual memory resources 804. As shown, the higher-level pages of the non-shared virtual memory resources 802 link to shared virtual memory resources 804, e.g., in the manner set forth with respect to FIG. 5, or in any other manner.

A process B employs non-shared virtual memory resources 806. In state (3), the process B process requests access to the memory-mapped file via its associated SCoMe unit. In response, the management system 222 links process B to the shared virtual memory resources 804 in the manner set forth above. Overall, process A is currently utilizing virtual memory resources enclosed in the dashed-line box 808, while process B is utilizing virtual memory resources enclosed in the dashed-line box 810. The boxes intersect to indicate that that parts of the virtual memory resources are shared by the two processes.

Figure 9:
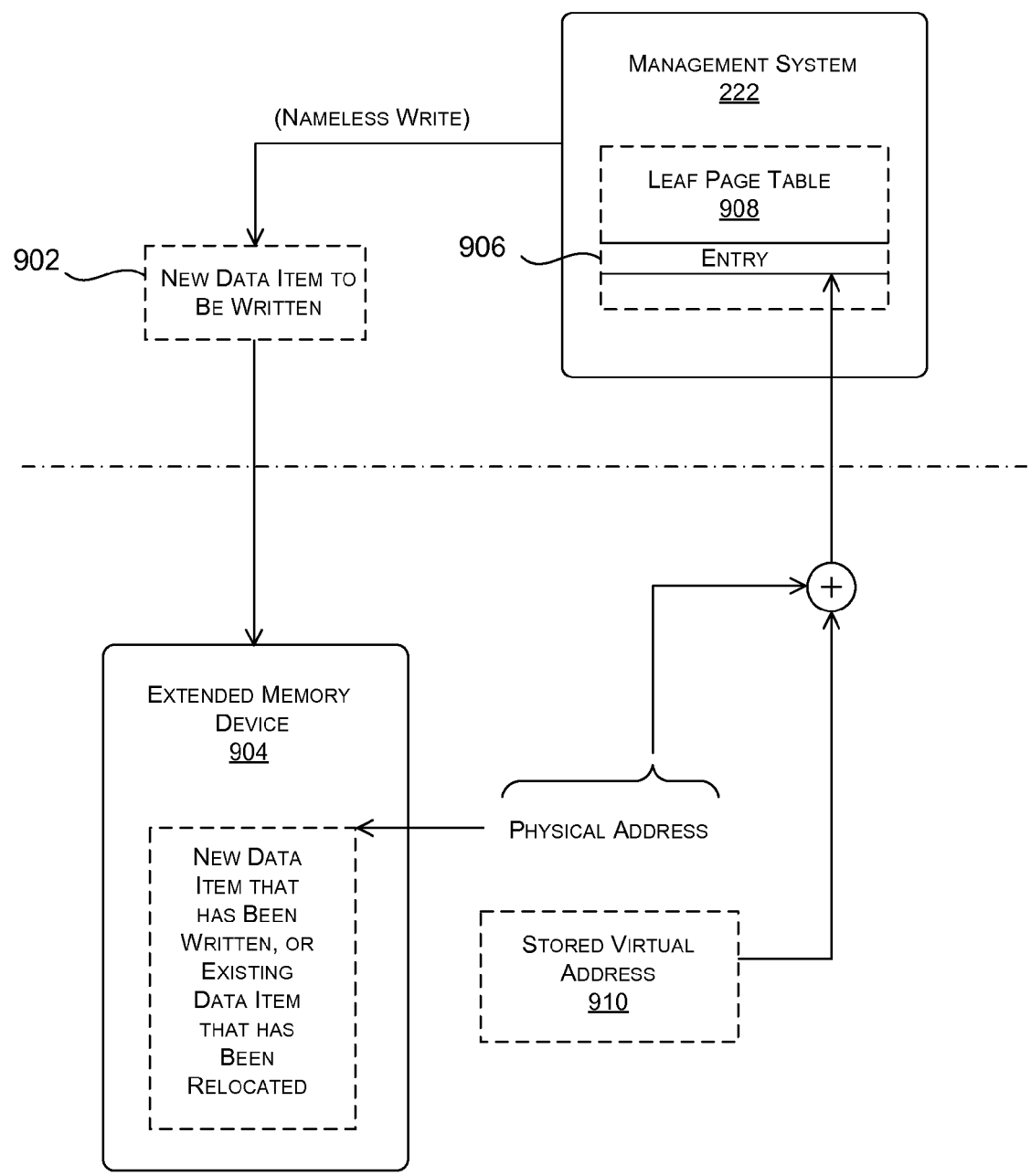
FIG. 9 shows one technique by which the computer system (of FIG. 4) may write a data item to a storage device using a nameless write approach.

FIG. 9 shows one technique by which the memory interaction module 418 (of FIG. 4) may write a data item 902 to an extended memory device 904, such as a flash storage device. In a nameless write procedure, the data item 902 may be associated with a virtual address, but not a physical address. In response to the write operation, the extended memory device 904 may independently select a physical address at which to store the data item 902. The extended memory device 904 may use any consideration or combination of considerations in selecting the physical address, such as a wear-leveling consideration, a garbage collection consideration, and/or other management process consideration.

After storing the new data item 902, the extended memory device 904 informs the management system 222 of the physical address at which it has stored the data item. The SCoMe interaction module 406 can then insert that physical address in an appropriate entry 906 in an appropriate leaf page table 908, thereby updating the leaf page table 908 so that it can subsequently map a virtual address to a correct physical address for the data item in question. To perform this task, the extended memory device 904 can preserve knowledge of the virtual memory address associated with the new data item 902. For example, the extended memory device 904 can store a virtual address 910, associated with the new data item 902, at any location within the device. The extended memory device 904 may then report the virtual address 910 along with the selected physical address to the management system 222. The management system 222 uses the virtual address 910 to locate the appropriate entry 906 in the appropriate leaf page table 908 for updating. As a result of this technique, the leaf page table 908 implicitly incorporates the outcome of the wear-leveling process, garbage collection process, and/or any other management process used by the flash storage device.

In another case, the memory interaction module 418 can write a set of data items in bulk mode to the extended memory device 904. The extended memory device 904 may respond by sending back a vector to the management system 222 that specifies plural physical addresses and plural corresponding virtual addresses.

In another scenario, assume that the extended memory device 904 already stores a data item at a first storage location in the extended memory device 904. It may move the data item to a second storage location in the extended memory device 904 based on any consideration or combination of considerations. The extended memory device 904 reports the new physical address to the management system 222 in the same manner explained above, e.g., by leveraging a stored virtual address associated with the moved data item to locate the appropriate entry in the appropriate leaf page table.

B. Illustrative Processes

This section describes the operation of the computer system 402 in flowchart form. Since the principles underlying the operation of the computer system 402 have already been described in Section A, certain operations will be addressed in summary fashion in this section.

Figure 10:
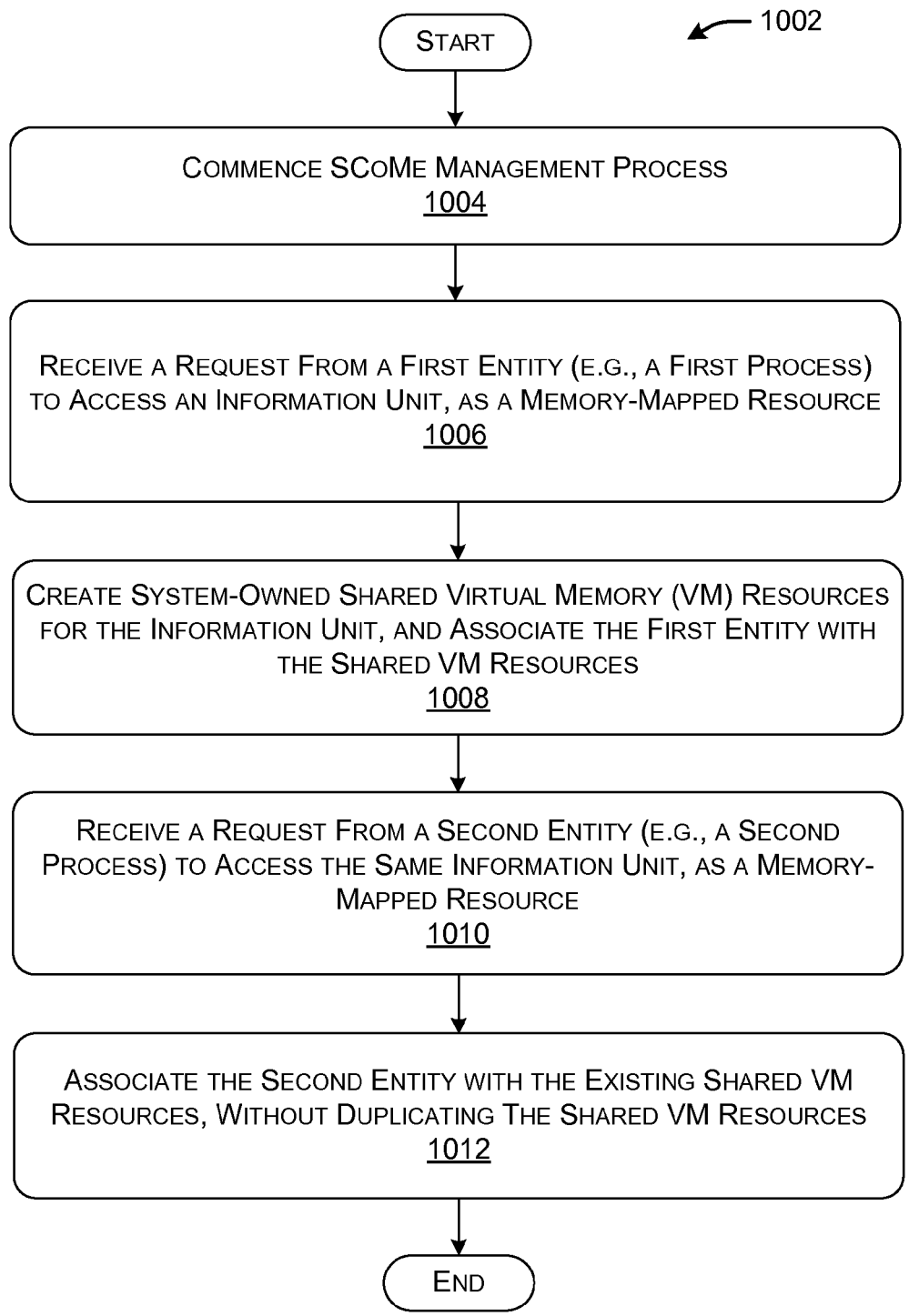
FIG. 10 is a flowchart that describes one manner by which two (or more) processes (or other entities) may interact with an information unit via shared virtual memory resources.

FIG. 10 shows a process 1002 that describes one manner by which two (or more) entities (e.g., processes) may interact with an information unit (such as a file) via shared virtual memory, thereby interacting with the information unit in a memory-mapped manner. In block 1004, the computer system 402 commences the SCoMe management process, e.g., by identifying a range of shared virtual memory 304. In block 1006, the computer system 402 receives a request from a first entity to access an information unit (e.g., a file), as a memory-mapped resource. In block 1008, the computer system 402 creates shared virtual memory resources for use in interacting with the information unit, and associates the first entity with the shared virtual memory resources. In block 1010, the computer system 402 receives a request from a second entity to access the same information unit as the first process, as a memory-mapped resource. In block 1012, the computer system 402 associates the second entity with the existing shared virtual memory resources, rather than creating a private instance of these resources for use by the second entity.

More specifically, block 1008 can entail creating a SCoMe unit associated with a file. Block 1012 may entail linking the second entity to the SCoMe unit, without producing a new instance of the SCoMe unit. More concretely stated, both the first and second entities link to and share the leaf page tables associated with the SCoMe unit, rather than creating separate private instances of the leaf page tables.

Figure 11:
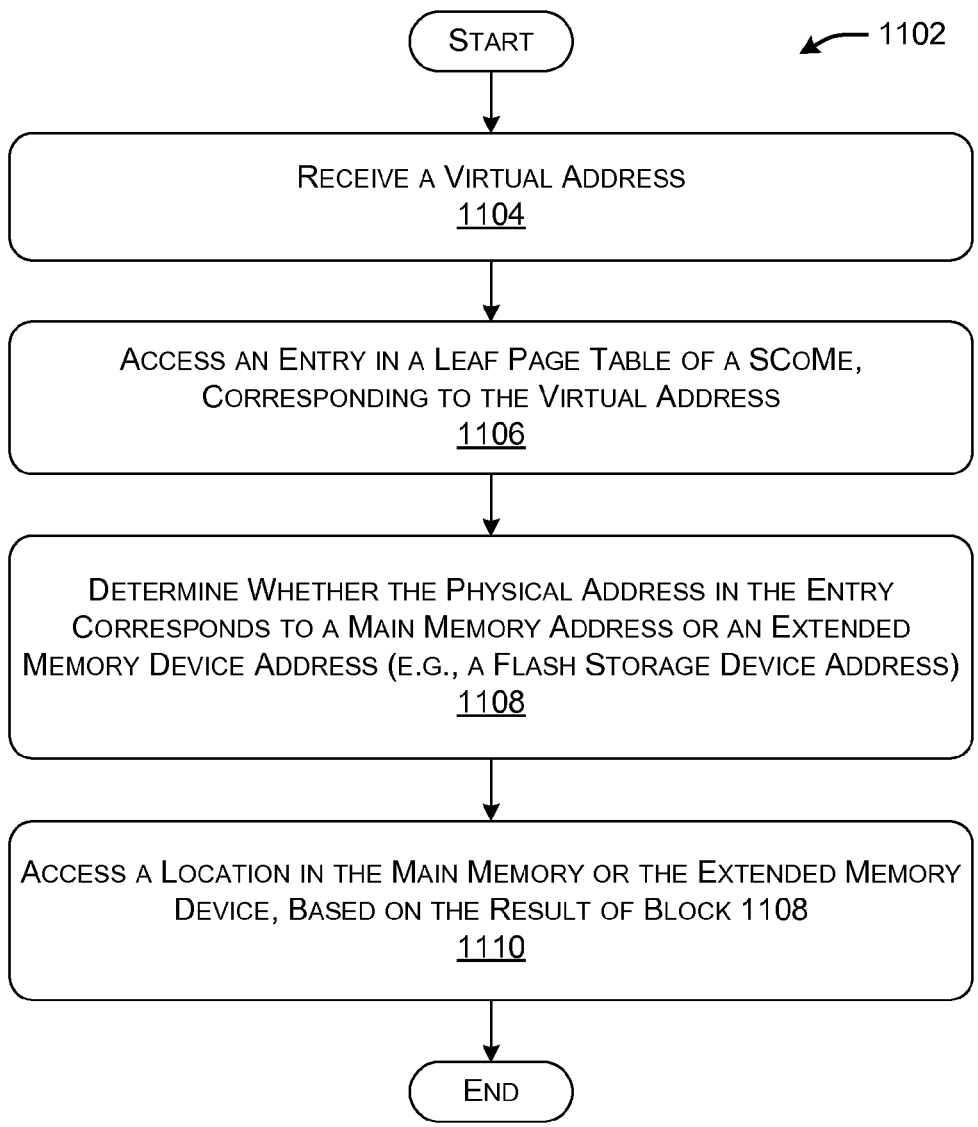
FIG. 11 is a flowchart that shows one manner by which the computer system (of FIG. 4) may convert virtual addresses to corresponding physical addresses.

FIG. 11 shows a process 1102 that describes one manner by which the computer system 402 may access locations in main memory 324 and an extended memory device 326 (e.g., a flash storage device), using shared virtual memory resources. In block 1104, the computer system 402 receives a virtual address. In block 1106, the computer system 402 accesses an entry in a leaf page table of a SCoMe unit, corresponding to the specified virtual address. In block 1108, the computer system 402 can consult control information provided by the entry to determine whether the entry specifies a physical address in the main memory 324 or a physical address in the extended memory device 326. In block 1110, the computer system 402 can access a location in the main memory 324 or the extended memory device 326, based on a determination result produced in block 1108.

C. Representative Computing Functionality

FIG. 12 shows computing functionality 1202 that can be used to implement any aspect of the computer system 402 of FIG. 4. In one case, the type of computing functionality 1202 is implemented by one or more computing devices of any type, such as a personal computer, a server, etc. In all cases, the computing functionality 2002 represents one or more physical and tangible processing mechanisms.

The computing functionality 1202 can include one or more processing devices 1204, such as one or more central processing units (CPUs), and/or one or more graphical processing units (GPUs), and so on.

The computing functionality 1202 can also include any storage resources 1206 for storing any kind of information, such as code, settings, data, etc. Without limitation, for instance, the storage resources 1206 may include any of: RAM of any type(s), ROM of any type(s), bulk-erase type block storage devices (e.g., flash storage devices), hard disks, optical disks, and so on. For example, the storage resources 1206 can include the types of physical storage devices 322 described above.

More generally, any storage resource can use any technology for storing information. Further, any storage resource may provide volatile or non-volatile retention of information. Further, any storage resource may represent a fixed or removal component of the computing functionality 1202. The computing functionality 1202 may perform any of the functions described above when the processing devices 1204 carry out instructions stored in any storage resource or combination of storage resources. For example, the computing functionality 1202 can perform the functions of the operating system 428, including the management system 222, when the processing devices 1204 carry out computer instructions that implement the functions of the operating system 428.

As to terminology, any of the storage resources 1206, or any combination of the storage resources 1206, may be regarded as a computer readable medium. In many cases, a computer readable medium represents some form of physical and tangible entity. The term computer readable medium also encompasses propagated signals, e.g., transmitted or received via physical conduit and/or air or other wireless medium, etc. However, the specific terms "computer readable storage medium" and "computer readable medium device" expressly exclude propagated signals per se, while including all other forms of computer readable media.

The computing functionality 1202 also includes one or more drive mechanisms 1208 for interacting with any storage resource, such as a hard disk drive mechanism, an optical disk drive mechanism, and so on.

The computing functionality 1202 also includes an input/output module 1210 for receiving various inputs (via input devices 1212), and for providing various outputs (via output devices 1214). Illustrative input devices include a keyboard device, a mouse input device, a touchscreen input device, a digitizing pad, one or more video cameras, one or more depth cameras, a free space gesture recognition mechanism, one or more microphones, a voice recognition mechanism, any movement detection mechanisms (e.g., accelerometers, gyroscopes, etc.), and so on. One particular output mechanism may include a presentation device 1216 and an associated graphical user interface (GUI) 1218. Other output devices include a printer, a model-generating mechanism, a tactile output mechanism, an archival mechanism (for storing output information), and so on. The computing functionality 1202 can also include one or more network interfaces 1220 for exchanging data with other devices via one or more communication conduits 1222. One or more communication buses 1224 communicatively couple the above-described components together.

The communication conduit(s) 1222 can be implemented in any manner, e.g., by a local area network, a wide area network (e.g., the Internet), point-to-point connections, etc., or any combination thereof. The communication conduit(s) 1222 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 1202 can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc.

In closing, the description may have described various concepts in the context of illustrative challenges or problems. This manner of explanation does not constitute a representation that others have appreciated and/or articulated the challenges or problems in the manner specified herein. Further, the claimed subject matter is not limited to implementations that solve any or all of the noted challenges/problems.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer system comprising:
   main memory configured to physically store data items;
   an extended memory device configured to physically store the data items; and
   a processing device configured via computer instructions to:
      provide shared virtual memory, selected from within a larger available region of virtual memory, for use in representing individual data items provided by at least one information unit;
      provide a set of shared tables mapping virtual addresses that fall within the shared virtual memory to physical addresses, the shared virtual memory and the set of shared tables comprising shared virtual memory resources;
      provide permissions associated with a first entity with respect to the shared virtual memory resources; and
      consistently with the permissions, provide the first entity and a second entity with access to the individual data items provided by said at least one information unit, the access provided via the shared virtual memory resources.

2. The computer system of claim 1, wherein the processing device is further configured via the computer instructions to:
   provide non-shared virtual memory resources for use by the first entity and the second entity.

3. The computer system of claim 2, wherein the first entity links to the shared virtual memory resources via an instance of non-shared virtual memory resources associated with the first entity.

4. The computer system of claim 3, wherein the instance of non-shared virtual memory resources includes the permissions.

5. The computer system of claim 1, wherein the processing device is further configured via the computer instructions to:
   copy at least a portion of an individual shared table to produce a forked table; and
   assign different permissions to the forked table compared to other permissions associated with the individual shared table.

6. The computer system of claim 1, wherein:
   the set of shared tables corresponds to a set of shared leaf page tables, and
   when the first entity utilizes an individual shared leaf page table, the first entity links to the individual shared leaf page table via at least one higher-level page table, said at least one higher-level page table being privately associated with the first entity.

7. The computer system of claim 1, wherein:
the shared virtual memory resources include a plurality of self-contained memory (SCoMe) units,
each SCoMe unit is associated with a particular information unit,
each SCoMe unit identifies one or more SCoMe virtual memory regions, selected from the shared virtual memory, and
each SCoMe unit provides a corresponding shared table for each SCoMe virtual memory region, the corresponding shared table translating virtual addresses that fall within that SCoMe virtual memory region into corresponding physical addresses.

8. The computer system of claim 7, wherein the processing device is further configured via the computer instructions to:
allocate additional shared virtual memory to a particular SCoMe unit, when requested, in units of a specified size.

9. The computer system of claim 1, wherein the processing device is further configured via the computer instructions to:
receive an individual virtual address that falls within the shared virtual memory;
identify an entry in an individual shared table that corresponds to the individual virtual address, the entry specifying an individual physical address;
determine whether the individual physical address corresponds to a main memory address in the main memory or an extended memory address in the extended memory device, to provide a determination result; and
access either the main memory address in the main memory or the extended memory address in the extended memory device, based at least on the determination result.

10. The computer system of claim 1, wherein the extended memory device is a bulk-erase type block storage device and the processing device is further configured via the computer instructions to:
use the shared virtual memory resources, in conjunction with non-shared virtual memory resources, to map a first virtual address identified by the first entity into a physical location within the bulk-erase type block storage device.

11. The computer system of claim 10, wherein the processing device is further configured via the computer instructions to:
select particular locations at which particular data items are written in the bulk-erase type block storage device to distribute the particular data items within the bulk-erase type block storage device based at least on a wear-leveling strategy;
select the particular locations at which the particular data items are written in the bulk-erase type block storage device to facilitate erasure of blocks of the particular data items in the bulk-erase type block storage device; and
use the particular locations for mapping individual virtual addresses to the bulk-erase type block storage device.

12. The computer system of claim 11, the computer instructions being provided by an operating system of the computer system.

13. A system comprising:
a random-access memory;
a bulk-erase block storage device; and
a processing device configured via computer instructions to:
provide shared virtual memory to a plurality of entities to store information units;
provide a shared table that maps virtual addresses that fall within the shared virtual memory to physical addresses on the random-access memory and the bulk-erase block storage device, the shared table including permission information with respect to the information units; and
consistently with the permission information, provide the plurality of entities with access to the information units stored in the shared virtual memory using the shared table.

14. The system of claim 13, wherein the processing device is configured via the computer instructions to:
manage the shared table to distribute the information units on the bulk-erase block storage device in accordance with a wear-leveling consideration.

15. The system of claim 14, wherein the bulk-erase block storage device is a flash storage device.

16. The system of claim 15, wherein the random-access memory is a dynamic random-access memory.

17. The system of claim 16, wherein the shared table indicates that certain virtual addresses map to certain physical addresses on the random-access memory and other virtual addresses map to other physical addresses on the bulk-erase block storage device.

18. A method comprising:
providing shared virtual memory to a plurality of entities to store information units on a plurality of storage devices;
providing a shared table that maps virtual addresses that fall within the shared virtual memory to physical addresses on the plurality of storage devices, the shared table including permission information with respect to the information units; and
consistently with the permission information, providing the plurality of entities with access to the information units stored in the shared virtual memory using the shared table.

19. The method of claim 18, the plurality of storage devices including a random-access memory and a bulk-erase storage device, wherein the shared table indicates that a first information unit is stored on the random-access memory and a second information unit is stored on the bulk-erase storage device.

20. The method of claim 19, the permission information indicating the second information unit is read-only, the method further comprising:
providing read-only access to the second information unit to the plurality of entities via the shared table;
providing a forked table having custom permission information, other than read-only permission, for an individual entity with respect to the second information unit;
linking a private table associated with the individual entity to the forked table; and
consistently with the custom permission information, providing the individual entity with access to the second information unit.

* * * * *